(12) United States Patent
Wang et al.

(10) Patent No.: US 12,548,160 B2
(45) Date of Patent: Feb. 10, 2026

(54) METHOD FOR TRAINING IMAGE PROCESSING MODEL

(71) Applicant: Tencent Technology (Shenzhen) Company Limited, Guangdong (CN)

(72) Inventors: Liang Wang, Guangdong (CN); Jianhua Yao, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 463 days.

(21) Appl. No.: 17/973,677

(22) Filed: Oct. 26, 2022

(65) Prior Publication Data
US 2023/0051951 A1    Feb. 16, 2023

Related U.S. Application Data

(63) Continuation of application No. PCT/CN2022/089637, filed on Apr. 27, 2022.

(30) Foreign Application Priority Data

May 26, 2021    (CN) .......................... 202110580636.8

(51) Int. Cl.
*G06T 7/11*    (2017.01)
*G06T 7/00*    (2017.01)
(Continued)

(52) U.S. Cl.
CPC .............. *G06T 7/11* (2017.01); *G06T 7/0012* (2013.01); *G06T 7/136* (2017.01); *G06T 7/155* (2017.01);
(Continued)

(58) Field of Classification Search
CPC . G06T 7/11; G06T 7/136; G06T 7/174; G06T 7/90; G06T 7/155; G06T 7/0012;
(Continued)

(56) References Cited

U.S. PATENT DOCUMENTS

| 2010/0092085 A1 | 4/2010 | Marchesotti |
| 2021/0295528 A1* | 9/2021 | Fuchs .................. G06V 10/751 |

(Continued)

FOREIGN PATENT DOCUMENTS

| CN | 105787437 | 7/2016 |
| CN | 109410220 A | 3/2019 |

(Continued)

OTHER PUBLICATIONS

International Search Report issued Jul. 18, 2022 in International (PCT) Application No. PCT/CN2022/089637.
(Continued)

*Primary Examiner* — Syed Haider
(74) *Attorney, Agent, or Firm* — Crowell & Moring LLP

(57) ABSTRACT

This disclosure relates to a model training method and apparatus and an image processing method and apparatus. The model training method includes: obtaining a first sample image and a first standard region proportion corresponding to a first object in the first sample image; obtaining a standard region segmentation result corresponding to the first sample image based on the first standard region proportion; and training a first initial segmentation model based on the first sample image and the standard region segmentation result, to obtain a first target segmentation model.

17 Claims, 13 Drawing Sheets

---

Obtain a first sample image and a first standard region proportion corresponding to a first object in the first sample image — 401

Obtain a standard region segmentation result corresponding to the first sample image based on the first standard region proportion, the standard region segmentation result being for indicating a region of the first objects in the first sample image — 402

Train a first initial segmentation model based on the first sample image and the standard region segmentation result, to obtain a first target segmentation model — 403

(51) Int. Cl.
  *G06T 7/136* (2017.01)
  *G06T 7/155* (2017.01)
  *G06T 7/174* (2017.01)
  *G06T 7/90* (2017.01)

(52) U.S. Cl.
  CPC ............... *G06T 7/174* (2017.01); *G06T 7/90* (2017.01); *G06T 2207/10024* (2013.01); *G06T 2207/10056* (2013.01); *G06T 2207/20021* (2013.01); *G06T 2207/20036* (2013.01); *G06T 2207/20081* (2013.01); *G06T 2207/30096* (2013.01)

(58) Field of Classification Search
  CPC . G06T 2207/10024; G06T 2207/10056; G06T 2207/20021; G06T 2207/20036; G06T 2207/20081; G06T 2207/30096
  See application file for complete search history.

(56) References Cited

U.S. PATENT DOCUMENTS

| | | | | |
|---|---|---|---|---|
| 2021/0366151 A1* | 11/2021 | Liu | ................ | G06V 10/454 |
| 2021/0374453 A1* | 12/2021 | Kuo | ................ | G06V 10/7715 |
| 2022/0036124 A1* | 2/2022 | Gao | ................ | G06T 7/136 |
| 2023/0290480 A1* | 9/2023 | Bose | ................ | A61N 5/1039 |

FOREIGN PATENT DOCUMENTS

| | | |
|---|---|---|
| CN | 109858476 | 6/2019 |
| CN | 110889463 | 3/2020 |
| CN | 112330624 | 2/2021 |
| CN | 112330690 A | 2/2021 |
| CN | 112419295 | 2/2021 |
| CN | 112132206 | 12/2021 |
| CN | 113781387 | 12/2021 |
| WO | WO 2019222936 A1 | 11/2019 |

OTHER PUBLICATIONS

Chinese-language Office Action issued in Chinese Application No. 202110580636.8 dated May 16, 2025 with English translation (18 pages).

\* cited by examiner (1)

(2)

(3)

(4)

(5)

(6)

METHOD FOR TRAINING IMAGE PROCESSING MODEL

RELATED APPLICATION

This application is a continuation application of PCT Patent Application No. PCT/CN2022/089637, filed on Apr. 27, 2022, which claims priority to Chinese Patent Application No. 202110580636.8, entitled "MODEL TRAINING METHOD AND APPARATUS, IMAGE PROCESSING METHOD AND APPARATUS, DEVICE, AND STORAGE MEDIUM" and filed with the National Intellectual Property Administration, PRC on May 26, 2021, wherein the content of the of the above-referenced applications is incorporated herein by reference in its entirety.

FIELD OF THE TECHNOLOGY

Embodiments of this disclosure relate to the field of artificial intelligence technologies, and in particular, to a model training method and apparatus, an image processing method and apparatus, a device, and a storage medium.

BACKGROUND OF THE DISCLOSURE

With the increase of image acquisition methods, there are more types of images, and a quantity of application scenarios for image processing increases. One of the application scenarios is that: an image includes a large quantity of smaller-sized objects to which attention needs to be paid, and such an image is processed to obtain a measurement indicator corresponding to the image. The measurement indicator corresponding to the image is used for indicating a region proportion corresponding to objects in the image that meet a specific condition. In other words, the measurement indicator corresponding to the image is used for indicating a proportion of a region in the image, where the objects located in the region in the image meet the specific condition. For example, a tumor image including a large quantity of smaller-sized stained cells is processed to obtain a measurement indicator corresponding to the tumor image. The measurement indicator corresponding to the tumor image is used for indicating a region proportion corresponding to stained cells outside a cancer cell region, that is, the measurement indicator corresponding to the tumor image is used for indicating a proportion of a region of the stained cells outside the cancer cell region in the tumor image.

In the related art, an image is manually compared with preset template images, and a preset measurement indicator corresponding to a template image most matching the image is used as a measurement indicator corresponding to the image. Such an image processing process is manually performed, which is greatly influenced by human subjectivity. As a result, image processing is less stable and efficient, and the accuracy of an obtained measurement indicator is low.

SUMMARY

Embodiments of this disclosure provide a model training method and apparatus, an image processing method and apparatus, a device, and a storage medium, to improve stability and efficiency of image processing, and improve accuracy of an obtained measurement indicator. The technical solutions are as follows:

According to an aspect, an embodiment of this disclosure provides an image processing method, performed by a computer device, the method including:

obtaining an image comprising a first object;

performing attribute transformation on the image to obtain an attribute-transformed image having a target visual attribute;

invoking a first target segmentation model to perform region segmentation on the attribute-transformed image, to obtain a first region segmentation result corresponding to the image, the first region segmentation result being for indicating a region of the first object in the image; and obtaining a measurement indicator corresponding to the image based on the first region segmentation result, the measurement indicator being for indicating a proportion of a region in the image, a first object located in the region in the image meeting a region limiting condition.

An imaging processing model training method is further provided, performed by a computer device, the method including:

obtaining a first sample image and a first standard region proportion corresponding to a first object in the first sample image;

obtaining a standard region segmentation result corresponding to the first sample image based on the first standard region proportion, the standard region segmentation result being for indicating a region of the first object in the first sample image; and training a first initial segmentation model based on the first sample image and the standard region segmentation result, to obtain a first target segmentation model.

An image processing model training method is further provided, performed by a computer device, the method including:

obtaining a first sample image and a standard region segmentation result corresponding to the first sample image, the standard region segmentation result being for indicating a region of a first object in the first sample image;

performing attribute transformation on the first sample image to obtain an attribute-transformed first sample image having a target visual attribute; and training a first initial segmentation model based on the attribute-transformed first sample image and the standard region segmentation result, to obtain a first target segmentation model.

According to another aspect, a computer device is provided, the computer device including a processor and a memory, the memory storing at least one computer program, the at least one computer program being loaded and executed by the processor to cause the computer device to implement the image processing method according to any one of the foregoing aspects or the model training method according to any one of the foregoing aspects.

According to another aspect, a non-transitory computer-readable storage medium is further provided, the non-transitory computer-readable storage medium storing at least one computer program, the at least one computer program being loaded and executed by a processor to cause a computer to implement the image processing method according to any one of the foregoing aspects or the model training method according to any one of the foregoing aspects.

According to another aspect, a computer program product or a computer program is provided, the computer program product or the computer program including computer instructions, the computer instructions being stored in a computer-readable storage medium. A processor of a computer device reads the computer instructions from the computer-readable storage medium and executes the computer instructions to cause the computer device to perform the image processing method according to any one of the foregoing aspects or the model training method according to any one of the foregoing aspects.

In the embodiments of this disclosure, a standard region segmentation result is obtained based on a standard region proportion. The standard region segmentation result is more accurate, and a first target segmentation model obtained by training according to the standard region segmentation result has a better region segmentation function. Therefore, the first target segmentation model can be invoked to implement a process of automatically obtaining a measurement indicator corresponding to an image, which can improve the stability and efficiency of image processing, and improve the accuracy of a measurement indicator corresponding to an obtained image.

In addition, the process of automatically obtaining a measurement indicator corresponding to an image is implemented by invoking the first target segmentation model. Such an image processing process does not require manual participation, and image processing is more stable and efficient. Before the first target segmentation model is invoked to perform region segmentation, the image is first transformed into an image having a target visual attribute, to reduce interference caused by visual attributes of the image to the first target segmentation model, so that a first region segmentation result segmented by invoking the first target segmentation model is more accurate, thereby improving the accuracy of the obtained measurement indicator.

DESCRIPTION OF EMBODIMENTS

To make objectives, technical solutions, and advantages of this disclosure clearer, the following further describes implementations of this disclosure in detail with reference to the accompanying drawings.

For ease of understanding the technical solutions in the embodiments of this disclosure, terms involved in the embodiments of this disclosure are explained below.

Programmed Death 1 (PD-1): It is a receptor protein on a T-cell surface of immune cells.

Programmed Cell Death-Ligand 1 (PD-L1): It is a ligand for PD-1.

IC score (IC percentage value or IC proportion value, which is referred to as IC value for short): It is a percentage value of immune cells to a tumor region.

In an exemplary embodiment, an image processing method and a model training method provided in the embodiments of this disclosure are applicable to the field of artificial intelligence (AI) technologies.

Figure 1:
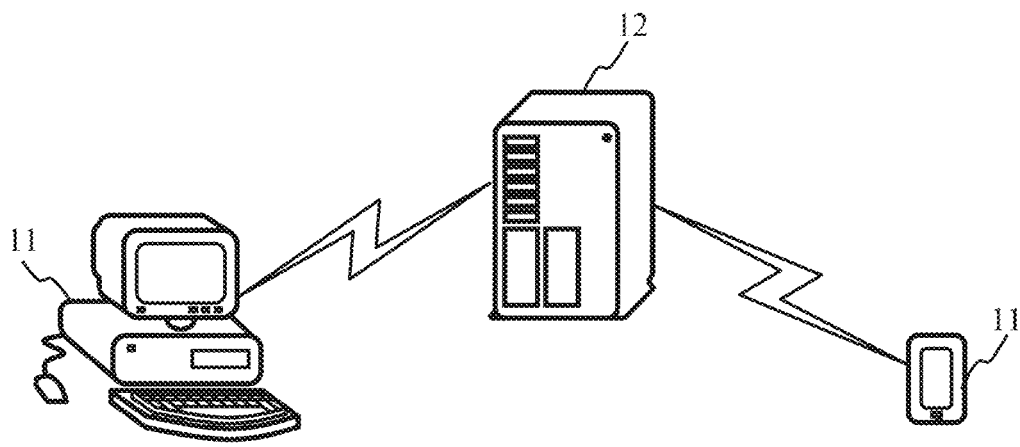
FIG. 1 is a schematic diagram of an implementation environment according to an embodiment of this disclosure.

FIG. 1 is a schematic diagram of an implementation environment according to an embodiment of this disclosure. The implementation environment may include a terminal 11 and a server 12.

The image processing method provided in the embodiments of this disclosure may be performed by the terminal 11, or may be performed by the server 12, or may be jointly performed by the terminal 11 and the server 12. This is not limited in the embodiments of this disclosure. When the image processing method provided in the embodiments of this disclosure is jointly performed by the terminal 11 and a server 12, the server 12 is responsible for primary computing work, and the terminal 11 is responsible for secondary computing work; or the server 12 is responsible for secondary computing work, and the terminal 11 is responsible for primary computing work; or the server 12 and the terminal 11 perform collaborative computing by using a distributed computing architecture between each other. The model training method provided in the embodiments of this disclosure may be performed by the terminal 11, or may be performed by the server 12, or may be jointly performed by the terminal 11 and the server 12. This is not limited in the embodiments of this disclosure. When the model training method provided in the embodiments of this disclosure is jointly performed by the terminal 11 and a server 12, the server 12 is responsible for primary computing work, and the terminal 11 is responsible for secondary computing work; or the server 12 is responsible for secondary computing work, and the terminal 11 is responsible for primary computing work; or the server 12 and the terminal 11 perform collaborative computing by using a distributed computing architecture between each other. The image processing method and the model training method provided in the embodiments of this disclosure may be performed by the same device, or may be performed by different devices. This is not limited in the embodiments of this disclosure.

In an implementation, the terminal 11 may be any electronic product that can interact with a user through one or more of a keyboard, a touchpad, a touch screen, a remote control, voice interaction, or a handwriting device, for example, a personal computer (PC), a mobile phone, a smartphone, a personal digital assistant (PDA), a wearable device, a pocket PC (PPC), a tablet computer, a smart on-board unit, a smart television, a smart speaker, and the like. The server 12 may be one server, a server cluster including a plurality of servers, or a cloud computing service center. The terminal 11 and the server 12 establish a communication connection through a wired or wireless network.

A person skilled in the art is to understand that the terminal 11 and server 12 are only examples, and other existing or potential terminals or servers that are applicable to this disclosure are also to be included in the scope of protection of this disclosure, and are included herein by reference.

Figure 2:
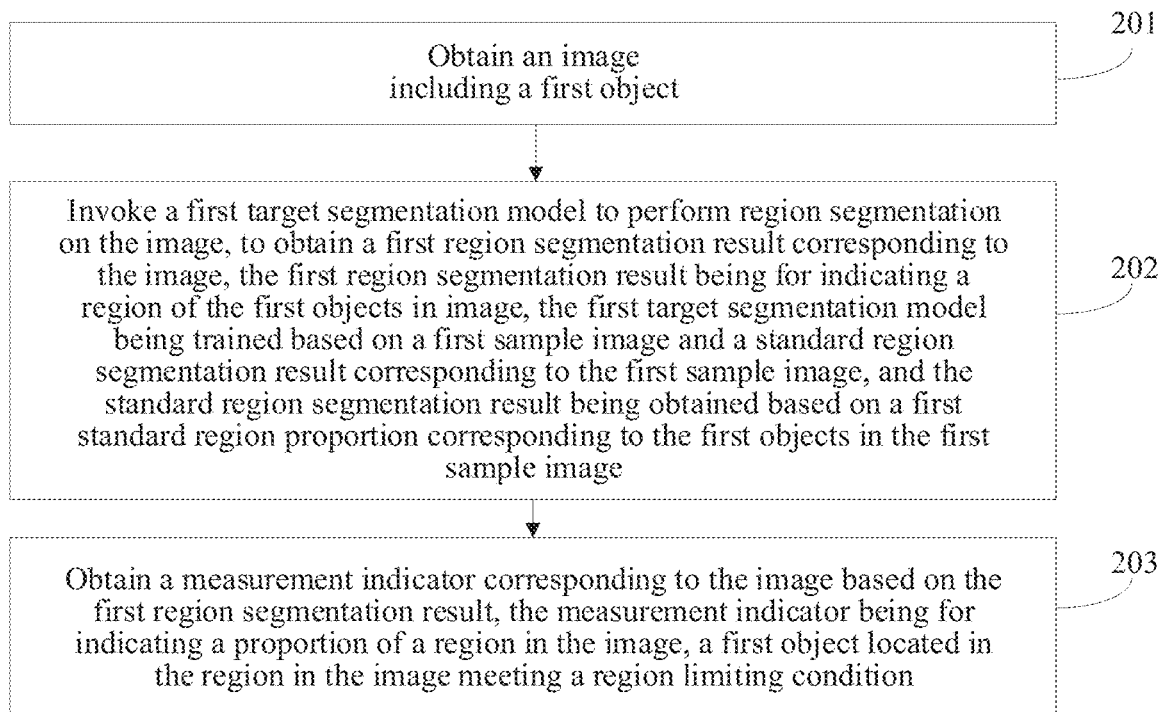
FIG. 2 is a flowchart of an image processing method according to an embodiment of this disclosure.

Based on the implementation environment shown in FIG. 1, an embodiment of this disclosure provides an image processing method. The image processing method is performed by a computer device. The computer device may be the server 12, or may be the terminal 11. This is not limited in the embodiments of this disclosure. As shown in FIG. 2, the image processing method provided in this embodiment of this disclosure includes steps 201 to 203.

In step 201, an image is obtained, the image including first objects.

The image is an image that needs to be processed, and the first objects are objects included in the image that need to be paid attention. In an exemplary embodiment, the first objects in the image are smaller-sized and have a large quantity, and therefore, it is difficult to manually label a region of the first objects accurately. Exemplarily, the image is a pathology image obtained by performing image acquisition on a lesion tissue in a pathology slide, and the first objects are stained cells in the pathology image. Exemplarily, the image is a tissue image obtained by performing image acquisition on a tissue slide, and the first objects are blood vessels in the tissue image.

The pathology slide may have particular features. For example, the pathology slide may be a pathology slide of a biological tissue in which a certain lesion occurs, i.e., a pathology slide of an animal or plant tissue in which a specific lesion occurs, a pathology slide of a tumor tissue in a part of the body, or the like. The pathology slide may be a stained slide, and some cells may be stained in a stained pathology slide. Cells that were stained are referred to as stained cells, which may be visually distinguished from other unstained cells and non-cells. Exemplarily, the pathology slide is a slide obtained by staining based on a PD-L1 method, and a tumor image, that is, the pathology image may be obtained by performing image acquisition on a field of view of a tumor region in the pathology slide obtained by staining based on the PD-L1 method.

A manner of obtaining an image by the computer device includes but is not limited to: extracting, by the computer device, the image from an image library; transmitting, by an image acquisition device in communication connection with the computer device, an acquired image to the computer device; and obtaining, by the computer device, the image that is manually uploaded. Exemplarily, the images in the image library and the manually uploaded images are images acquired by the image acquisition device.

The type of the image acquisition device used for acquiring the image is related to the type of the image. This is not limited in the embodiments of this disclosure. Exemplarily, the image acquisition device for acquiring an image includes but is not limited to: a microscope, an import scanner, a domestic scanner, and the like. Exemplarily, images acquired by different image acquisition devices may have the same or different visual attributes. A visual attribute of an image is used for indicating a vision-related attribute of the image, for example, brightness of the image, color intensity of the image, focus accuracy of the image, sharpness of the image, and the like.

Figure 3:
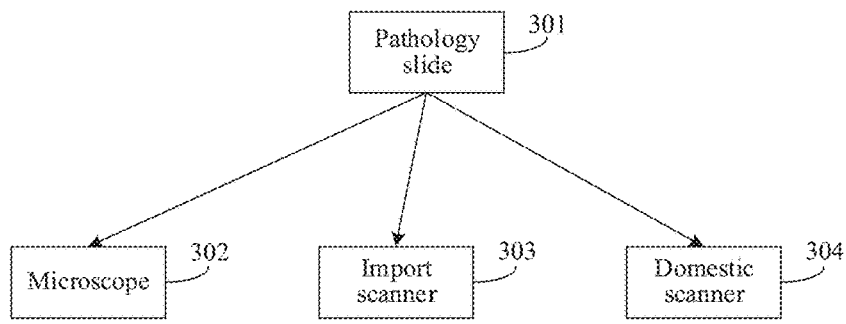
FIG. 3 is a schematic diagram of obtaining an image according to an embodiment of this disclosure.

For example, as shown in FIG. 3, after a pathology slide 301 is obtained by staining based on the PD-L1 method, image acquisition can be separately performed on the pathology slide 301 by using a microscope 302, an import scanner 303, and a domestic scanner 304, to obtain an image.

Exemplarily, image acquisition is performed on a plurality of fields of view in the pathology slide by using the image acquisition device, so that images of the plurality of field of view can be obtained. The plurality of field of view images can form a whole slide image (WSI). Exemplarily, the image is an image of a field of view of a tumor region (which is referred to as a tumor image for short), a region of interest (ROI) image obtained from the WSI image, and the like. Exemplarily, the ROI image is the tumor image. Exemplarily, the ROI image obtained from the WSI image may also be referred to as a patch image.

There are one or more images. This is not limited in the embodiments of this disclosure. When there are a plurality of images, each image includes first objects. The description is made in this embodiment of this disclosure by using an example in which there is one image. When there are a plurality of images, a measurement indicator corresponding to each image needs to be obtained according to step 202 and step 203.

In step 202, a first target segmentation model is invoked to perform region segmentation on the image, to obtain a first region segmentation result corresponding to the image, the first region segmentation result being used for indicating a region of the first objects in the image, the first target segmentation model being obtained by training based on a first sample image and a standard region segmentation result corresponding to the first sample image, and the standard region segmentation result being obtained based on a first standard region proportion corresponding to the first objects in the first sample image.

The first target segmentation model is a trained model configured to perform region segmentation on an image, to segment a region of the first objects in the image. The type of the first target segmentation model is not limited in this embodiment of this disclosure, as long as the first region segmentation result for indicating the region of the first objects in the image can be outputted. Exemplarily, the first target segmentation model is a Link Net model. The Link Net model has a lightweight network and parameters and can be run on a low-end computer device with a poor computation capability (such as a smart microscope). Moreover, the Link Net model has a good balance between the accuracy and speed. In addition, the Link Net model may also be run on another computer device with a strong computation capability, to reduce computation resources required for region segmentation performed on the image. Certainly, the first target segmentation model may be a segmentation model of another type.

The first target segmentation model is obtained by training based on the first sample image and the standard region segmentation result corresponding to the first sample image. The standard region segmentation result is obtained based on the first standard region proportion corresponding to the first objects in the first sample image. The standard region segmentation result corresponding to the first sample image is used for standardly indicating a region of the first objects in the first sample image. The first standard region proportion corresponding to the first objects in the first sample image is used for standardly indicating a proportion of the region where the first objects in the first sample image is located in the first sample image. Before step 202 is implemented, it is necessary to obtain the first target segmentation model through training. For a process of obtaining the first target segmentation model through training, reference may be made to an embodiment shown in FIG. 4.

In an implementation, the invoking a first target segmentation model to perform region segmentation on the image, to obtain a first region segmentation result corresponding to the image includes but is not limited to the following two manners:

First manner: Invoke the first target segmentation model to directly perform region segmentation on the image, to obtain the first region segmentation result corresponding to the image.

The image is directly inputted into the first target segmentation model, so that the first target segmentation model directly performs region segmentation on the image and outputs the first region segmentation result corresponding to the image. Obtaining the first region segmentation result based on the first manner is more efficient. A process of directly performing region segmentation on the image by the first target segmentation model is an internal processing process of the first target segmentation model and is related to the type of the first target segmentation model. This is not limited in the embodiments of this disclosure. Exemplarily, the first target segmentation model is a model formed by an encoder and a decoder. The process of directly performing region segmentation on the image by the first target segmentation model is as follows: The encoder in the first target segmentation model encodes the image, to obtain an image feature of the image; and the decoder in the first target segmentation model decodes the image feature of the image, to obtain the first region segmentation result corresponding to the image.

Second manner: Perform attribute transformation on the image, so that an attribute-transformed image has a target visual attribute; and invoke the first target segmentation model to perform region segmentation on the attribute-transformed image, to obtain the first region segmentation result corresponding to the image.

The target visual attribute is a preset visual attribute. Exemplarily, the target visual attribute is a visual attribute that brings a good visual feeling to the user. The target visual attribute may be empirically set, or may be flexibly adjusted according to the application scenario. This is not limited in the embodiments of this disclosure. Exemplarily, the target visual attribute is formed by one or more sub-attributes. For example, the target visual attribute is formed by at least one sub-attribute of sharpness, focal accuracy, color intensity, or brightness.

In the second manner, the first target segmentation model is invoked to perform region segmentation on the attribute-transformed image. In other words, the attribute-transformed image is inputted into the first target segmentation model, so that the first target segmentation model performs region segmentation on the attribute-transformed image and outputs the first region segmentation result corresponding to the image.

Since the attribute-transformed image has the target visual attribute, all images inputted into the first target segmentation model have the target visual attribute regardless of visual attributes included in the image. In the second manner, interference caused by visual attributes of the image to the first target segmentation model may be reduced, thereby improving accuracy of the first region segmentation result outputted by the first target segmentation model.

A process of performing region segmentation on the attribute-transformed image by the first target segmentation model is an internal processing process of the first target segmentation model and is related to the type of the first target segmentation model. This is not limited in the embodiments of this disclosure. Exemplarily, the first target segmentation model is a model formed by an encoder and a decoder. The process of performing region segmentation on the attribute-transformed image by the first target segmentation model is as follows: The encoder in the first target segmentation model encodes the attribute-transformed image, to obtain an image feature of the attribute-transformed image; and the decoder in the first target segmentation model decodes the image feature of the attribute-transformed image, to obtain the first region segmentation result corresponding to the image.

Before the first target segmentation model is invoked to perform region segmentation on the attribute-transformed image, attribute transformation needs to be first performed on the image, so that the attribute-transformed image has the target visual attribute.

In an implementation, the image corresponds to at least one color channel. The color channel corresponding to the image is related to a color space corresponding to the image. Exemplarily, the color space corresponding to the image is a hematoxylin-eosin-diaminobenzidine (which is referred to as DAB for short) (HED) color space, and there are three color channels corresponding to the image: an H channel, an E channel, and a DAB channel. Exemplarily, the color space corresponding to the image is a red-green-blue (RGB) color space, and there are three color channels corresponding to the image: an R channel, a G channel, and a B channel.

Exemplarily, the color space corresponding to the image is a hue-saturation-value (HSV) color space, and there are three color channels corresponding to the image: an H channel, an S channel, and a V channel. Exemplarily, the color spaces may be converted from one color space to another, and an image corresponding to a color space may be converted to another color space.

In an exemplary embodiment, when the image corresponds to at least one color channel, a process of performing attribute transformation on the image includes step a to step c:

Step a: Determine pixel mean values respectively corresponding to color channels based on pixel values of pixels in the image under the color channels.

Each pixel in the image corresponds to a pixel value under the color channels, a pixel value of one pixel under one color channel being used for indicating a value of the pixel under the color channel. A process of determining pixel mean values respectively corresponding to color channels based on pixel values of pixels in the image under the color channels includes: determining, for each of the color channels, a pixel mean value corresponding to one color channel based on pixel values of pixels in the image under the color channel.

The pixel values of the pixels in the image under one color channel are summed and divided by a total quantity of the pixels in the image, so that the pixel mean value corresponding to the color channel may be obtained. The pixel mean value corresponding to one color channel can reflect a mean value of the pixels in the image under the color channel.

Step b: Perform numeric transformation on the pixel mean values corresponding to the color channels by using reference values corresponding to the color channels, to obtain pixel value transformation references respectively corresponding to the color channels, the reference values corresponding to the color channels being determined based on the target visual attribute.

The reference values corresponding to the color channels are determined based on the target visual attribute. Exemplarily, the reference values corresponding to the color channels are manually set by empirically referring to the target visual attribute, or the reference values corresponding to the color channels are set by the computer device with reference to the target visual attribute. The reference values corresponding to the color channels can ensure that: a pixel value transformation reference is obtained based on the reference values corresponding to the color channels, and the pixel values of the pixels in the image under the color channels are transformed according to the pixel value transformation reference, so that transformed pixel values of the pixels in the image under the color channels conform to the target visual attribute.

Reference values corresponding to different color channels may be the same or different. This is related to actual conditions and is not limited in the embodiments of this disclosure. For example, when the color space corresponding to the image is the RGB color space, reference values corresponding to the R channel, the G channel, and the B channel are 180.

A process of performing numeric transformation on the pixel mean values corresponding to the color channels by using reference values corresponding to the color channels, to obtain pixel value transformation references respectively corresponding to the color channels includes: numerically transforming, for each of the color channels, a pixel mean value corresponding to one color channel by using a reference value corresponding to the color channel, to obtain a pixel value transformation reference corresponding to the color channel.

In an exemplary embodiment, a process of numerically transforming a pixel mean value corresponding to one color channel by using a reference value corresponding to the color channel may be regarded as a process of normalizing the pixel mean value corresponding to the color channel under the reference value corresponding to the color channel.

Exemplarily, a manner of numerically transforming a pixel mean value corresponding to one color channel by using a reference value corresponding to the color channel, to obtain a pixel value transformation reference corresponding to the color channel includes: determining a ratio of the reference value corresponding to the color channel to the pixel mean value corresponding to the color channel, and using the ratio as the pixel value transformation reference corresponding to the color channel.

Step c: Transform the pixel values of the pixels in the image under the color channels based on the pixel value transformation references respectively corresponding to the color channels.

After the pixel value transformation references corresponding to the color channels are obtained, the pixel values of the pixels in the image under the color channels are transformed based on the pixel value transformation references respectively corresponding to the color channels, and an image formed by pixels including the transformed pixel values is used as the attribute-transformed image. Since a pixel value transformation reference corresponding to each color channel is determined based on a reference value determined according to the target visual attribute, the image formed by the pixels including the transformed pixel values has the target visual attribute.

In a process of transforming the pixel values of the pixels in the image under the color channels based on the pixel value transformation references respectively corresponding to the color channels, the pixel value transformation reference corresponding to each color channel is used for transforming the pixel values of the pixels in the image under the color channel.

For example, when the color space corresponding to the image is the RGB color space, pixel values of the pixels in the image under the R channel are transformed based on a pixel value transformation reference corresponding to the R channel; pixel values of the pixels in the image under the G channel are transformed based on a pixel value transformation reference corresponding to the G channel; and pixel values of the pixels in the image under the B channel are transformed based on a pixel value transformation reference corresponding to the B channel. After pixel values of the pixels in the image under the R channel, the G channel, and the B channel, the image formed by pixels including the transformed pixel values is used as the attribute-transformed image.

Exemplarily, using an example in which the color space corresponding to the image is the RGB color space, the process of performing attribute transformation on the image based on step a to step c is implemented based on the following pseudo-code:

Input. img //Input an image
Output: result //Output an attribute-transformed image
bgr_mean=cv2.mean(img) //Obtain pixel mean values respectively corresponding to a B channel, a G channel, and an R channel based on the image kb=k/bgr_mean[0] //Use a ratio of a reference value k corresponding to the B channel to the pixel mean value bgr_mean[0] corresponding to the B channel as a pixel value transformation reference kb corresponding to the B channel kg=k/bgr_mean[1] //Use a ratio of a reference value k corresponding to the G channel to the pixel mean value bgr_mean[1] corresponding to the G channel as a pixel value transformation reference kg corresponding to the B channel kr=k/bgr_mean[2] //Use a ratio of a reference value k corresponding to the R channel to the pixel mean value bgr_mean[2] corresponding to the R channel as a pixel value transformation reference kr corresponding to the R channel result=img*[kb, kg, kr] //Transform pixel values of pixels in the image under the B channel, the G channel, and the R channel based on the pixel value transformation references respectively corresponding to the B channel, the G channel, and the R channel, to obtain the attribute-transformed image In another implementation, the process of performing attribute transformation on the image is as follows: obtaining an image transformation model, the image transformation model being configured to output an image having the target visual attribute; and invoking the image transformation model to perform attribute transformation on the image. In this way, the image transformation model is invoked to directly perform attribute transformation on the image, which may improve efficiency of performing attribute transformation on the image.

The image transformation model is configured to output an image having the target visual attribute. The obtaining an image transformation model may be an operation of extracting a pre-trained and stored image transformation model, or may be an operation of obtaining an image transformation model through training in real time. This is not limited in the embodiments of this disclosure. In any one of the manners, before the image transformation model is invoked to perform attribute transformation on the image, the image transformation model needs to be first obtained through training.

In an exemplary embodiment, the image transformation model is a generative model such as a generative adversarial network (GAN) model. A manner of obtaining an image transformation model through training is a generative adversarial manner. Exemplarily, in a process of obtaining an image transformation model through training in the generative adversarial manner, a generator (G) included in the GAN model is configured to generate a fake image by using a real image as a reference, and the real image and the fake image are inputted into a discriminator (D) included in the GAN model, D being configured to discriminate whether a received image is a real image or a fake image. When D succeed in discrimination, relevant parameters of G are adjusted, so that the fake image generated by G is more realistic. When D fails to discriminate, relevant parameters of D are adjusted to improve a discrimination capability of D. The real image used as a reference in a training process is an image having the target visual attribute, so that the image transformation model obtained through training can output the image having the target visual attribute.

In an exemplary embodiment, the image transformation model is a general-purpose image transformation model that can perform attribute transformation on images from a plurality of image acquisition devices. In this case, in the process of obtaining the image transformation model through training, it is necessary to perform training by using training images from a plurality of image acquisition devices, so that the image transformation model can transform images from the plurality of image acquisition devices into images having the target visual attribute, thereby improving applicability of the image transformation model.

In an exemplary embodiment, the image transformation model is a dedicated image transformation model configured to perform attribute transformation on images from an image acquisition device of the image. In this case, in the process of obtaining the image transformation model through training, training is performed by using training images from an image acquisition device, so that the efficiency of obtaining the image transformation model through training is higher.

Regardless of the manner of performing attribute transformation on the image, visual attributes of the image are changed by performing attribute transformation, and the first objects and the region of the first objects in the image may not be changed. Therefore, an attribute-transformed image also includes the first objects, and a region of the first objects in the attribute-transformed image is the same as the region of the first objects in the image.

The first region segmentation result corresponding to the image is obtained after the first target segmentation model is invoked to perform region segmentation on the image. The first region segmentation result is used for indicating the region of the first objects in the image. In other words, which region is the region of the first objects in the image can be determined according to the first region segmentation result. A representation form of the first region segmentation result is related to the first target segmentation model. The representation form of the first region segmentation result is not limited in the embodiments of this disclosure.

Exemplarily, the first region segmentation result is represented as an image. In the image, two different colors are used to distinguish between the region of the first objects and other regions. For example, the region of the first objects is displayed in white, the other regions are displayed in black. Alternatively, the region of the first objects is displayed in black, and the other regions are displayed in white.

Exemplarily, the first region segmentation result is represented as a matrix or a vector. The matrix or the vector can indicate categories of pixels in the image, and a category of any pixel is used for indicating whether the any pixel is located in the region of the first objects. Exemplarily, when the any pixel is located in the region of the first objects, the category of the any pixel is represented as a first value; and when the any pixel is not located in the region of the first objects, the category of the any pixel is represented as a second value. The first value is different from the second value. Both the first value and the second value are empirically set, or are flexibly adjusted according to the application scenario. This is not limited in the embodiments of this disclosure. Exemplarily, the first value is 1, and the second value is 0. Alternatively, the first value is 0, and the second value is 1.

In step 203, a measurement indicator corresponding to the image is obtained based on the first region segmentation result, the measurement indicator being used for indicating a proportion of a region in the image, first objects located in the region in the image meeting a region limiting condition.

The first region segmentation result is used for indicating a region where the first objects in the image is located in the image. After the first region segmentation result is obtained, a measurement indicator for indicating a region proportion corresponding to the first objects in the image that meet the region limiting condition is obtained based on the first region segmentation result. The region proportion corresponding to the first objects in the image that meet the region limiting condition is a proportion of a region in the image, first objects located in the region in the image meeting a region limiting condition. The measurement indicator corresponding to the image can measure a property of the image in one aspect. In this embodiment of this disclosure, the measurement indicator corresponding to the image can measure the proportion of the region of the first objects in the image that meet the region limiting condition in the image.

The region limiting condition is empirically set, or is flexibly adjusted according to the application scenario. This is not limited in the embodiments of this disclosure. Exemplarily, the first objects meeting the region limiting condition are first objects that are located in a region outside a certain region in the image, and whether the first objects meet the region limiting condition may be determined from whether the first objects are located in a region outside the certain region in the image. Exemplarily, the first objects meeting the region limiting condition are first objects that are located in a region inside a certain region in the image, and whether the first objects meet the region limiting condition may be determined from whether the first objects are located in the region inside the certain region in the image. Exemplarily, the first objects meeting the region limiting condition are first objects located in a region not less than an area threshold, and whether the first objects meet the region limiting condition may be determined from whether an area of the region of the first objects is less than the area threshold.

In an implementation, a process of obtaining a measurement indicator corresponding to the image based on the first region segmentation result includes steps 2031 to 2033.

Step 2031: Determine a target region in the image.

The target region is used for determining which are the first objects that meet the region limiting condition. Which region in the image being the target region is related to the image, the first objects, and the region limiting condition. Exemplarily, the image is a tumor image. Regions of the tumor image can be divided into a cancer cell region and a cancer cell stromal region. The first objects are stained cells, and stained cells that meet the region limiting condition are stained cells located within the cancer cell stromal region (that is, outside the cancer cell region). In this case, the target region may be the cancer cell region, or may be the cancer cell stromal region.

In an implementation, a manner of determining a target region in the image includes: invoking a target region detection model to perform region detection on the image to obtain a target region detection result, and determining the target region in the image according to the target region detection result. The type of the target region detection model is not limited in this embodiment this disclosure. Exemplarily, the target region detection model is a Link Net model.

The target region detection model is configured to detect the target region in the image, and the target region detection model needs to be first obtained through training before the target region detection model is invoked. In an implementation, a process of obtaining a target region detection model through training is as follows: obtaining a training image and a target region labeling corresponding to the training image; and training an initial region detection model in a supervised training manner according to the training image and the target region labeling corresponding to the training image, to obtain the target region detection model.

The target region labeling corresponding to the training image is used for indicating which region in the training image is the target region. Exemplarily, the target region labeling corresponding to the training image is manually labeled. Exemplarily, a process of training an initial region detection model in a supervised training manner according to the training image and the target region labeling corresponding to the training image is as follows: invoking the initial region detection model to detect the training image, to obtain the target region prediction result; comparing the target region prediction result with the target region labeling, to obtain a loss function; and updating model parameters of the initial region detection model by using the loss function. The type of the loss function is not limited in this embodiment of this disclosure. Exemplarily, the loss function is a mean-square error (MSE) loss function, an entropy loss function, an $L_2$ norm loss function, or the like.

In an exemplary embodiment, the invoking a target region detection model to perform region detection on the image may be an operation of invoking the target region detection model to directly perform region detection on the image, or may be an operation of invoking the target region detection model to perform region detection on an attribute-transformed image. This is not limited in the embodiments of this disclosure. When the target region detection model is invoked to perform region detection on the attribute-transformed image, in a process of obtaining a target region detection model through training, attribute transformation is first performed on the training image, and then the attribute-transformed training image is inputted into the initial region detection model for region detection.

Step 2032: Filter the region of the first objects in the image by using the target region, to obtain the region of the first objects that meet the region limiting condition in the image.

The first objects that meet the region limiting condition may be first objects located within the target region, or may be first objects located outside the target region. In different cases, there are different manners of filtering the region of the first objects in the image by using the target region, to obtain the region of the first objects that meet the region limiting condition in the image.

Exemplarily, when the first objects meeting the region limiting condition are first objects located within the target region, the manner of filtering the region of the first objects in the image by using the target region, to obtain the region of the first objects that meet the region limiting condition in the image is as follows: retaining a region of a first object when the region of the first object is within the target region; removing the region of the first object when the region of the first object is outside the target region; and using a finally-retained region as the region of the first object that meets the region limiting condition in the image. Exemplarily, when the first objects meeting the region limiting condition are first objects located outside the target region, the manner of filtering the region of the first objects in the image by using the target region, to obtain the region of the first objects that meet the region limiting condition in the image is as follows: retaining a region of a first object when the region of the first object is outside the target region; removing the region of the first object when the region of the first object is within the target region; and using a finally-retained region as the region of the first object that meets the region limiting condition in the image.

In other words, the target region is used for removing a region of the first objects that do not meet the region limiting condition and retaining a region of the first objects that meet the region limiting condition.

Step 2033: Compare the region of the first objects that meet the region limiting condition with a total region of the image, to obtain the measurement indicator corresponding to the image.

The measurement indicator corresponding to the image is used for indicating a region proportion corresponding to the first objects in the image that meet the region limiting condition, that is, the measurement indicator corresponding to the image is used for indicating a proportion of a region of the first objects in the image that meet the region limiting condition in the image. The region of the first objects that meet the region limiting condition is compared with the total region of the image, so that the measurement indicator corresponding to the image can be obtained. In an implementation, the comparing the region of the first objects that meet the region limiting condition with a total region of the image, to obtain the measurement indicator corresponding to the image includes but is not limited to the following two manners:

First manner: Use a ratio of a total area of the region of the first objects that meet the region limiting condition to a total area of the total region of the image as the measurement indicator of the image.

Second manner: Collect statistics on a first quantity of pixels located within the region of the first objects meeting the region limiting condition and a second quantity of pixels located within the total region of the image; and use a ratio of the first quantity to the second quantity as the measurement indicator corresponding to the image.

Exemplarily, the pixels located within the total region of the image are all pixels in the image.

Step 2031 to step 2033 described above are exemplary descriptions of obtaining a measurement indicator corresponding to the image, and the embodiments of this disclosure are not limited thereto. In an exemplary embodiment, all first objects are used as first objects that meet the region limiting condition. In this case, a manner of obtaining a measurement indicator corresponding to the image based on the first region segmentation result is as follows: determining a region of the first objects in the image based on the first region segmentation result; and comparing the region of the first objects with the total region of the image, to obtain the measurement indicator corresponding to the image.

In this embodiment of this disclosure, the process of automatically obtaining a measurement indicator corresponding to an image is implemented by invoking the first target segmentation model. Such an image processing process does not require manual participation, and image processing is more stable and efficient. In addition, a standard region segmentation result on which obtaining a first target segmentation model through training is based is obtained based on a standard region proportion corresponding to the first objects, which is more accurate. In this way, the first target segmentation model having a better region segmentation function can be obtained through training, and the measurement indicator obtained according to the first region segmentation result segmented by the first target segmentation model is more accurate.

Figure 4:
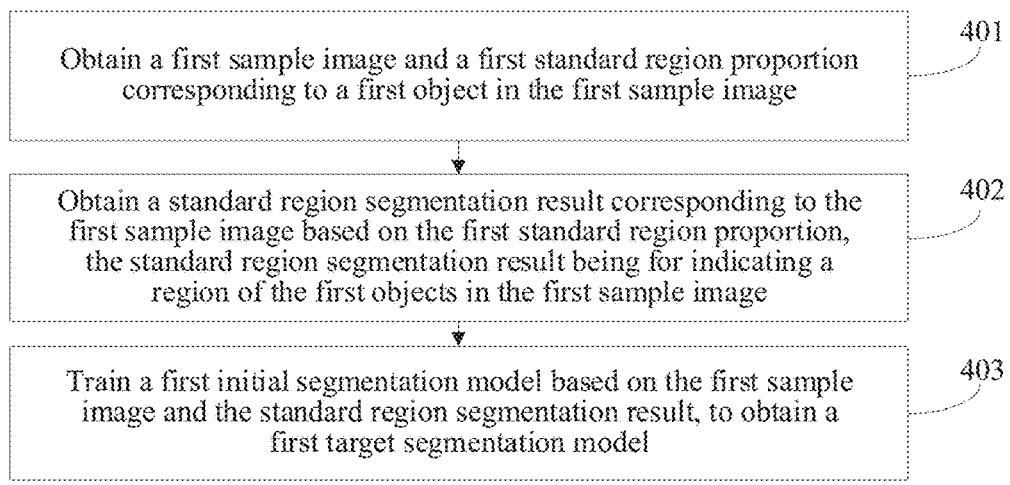
FIG. 4 is a flowchart of a model training method according to an embodiment of this disclosure.

Based on the implementation environment shown in FIG. 1, an embodiment of this disclosure provides a model training method. The model training method may be applied to perform training to obtain the first target segmentation model invoked in the embodiment shown in FIG. 2. The model training method is performed by a computer device. The computer device may be the server 12, or may be the terminal 11. This is not limited in the embodiments of this disclosure. As shown in FIG. 4, the model training method provided in this embodiment of this disclosure includes steps 401 to 403.

In step 401, a first sample image and a first standard region proportion corresponding to first objects in the first sample image are obtained.

Exemplarily, the first sample image is an image of the same type as the image in the embodiment shown in FIG. 2, to ensure that the first target segmentation model obtained through training can perform region segmentation on the image more accurately. The first standard region proportion corresponding to the first objects in the first sample image is used for indicating a proportion of the region where the first objects in the first sample image is located in the first sample image. Exemplarily, the first standard region proportion corresponding to the first objects in the first sample image is manually labeled. In this embodiment of this disclosure, the first objects in the first sample image are smaller-sized and have a large quantity, and therefore, it is difficult to manually label the region of the first objects. Generally, a region proportion corresponding to the first objects in the first sample image may only be manually estimated. In this embodiment of this disclosure, the region proportion corresponding to the first objects in the first sample image is referred to as the first standard region proportion.

There are one or more first sample images. This is not limited in the embodiments of this disclosure. Generally, there are a plurality of first sample images, so that a training effect of the first target segmentation model can be ensured. In an implementation, the first sample images are extracted from an image library. In another implementation, a manner of obtaining a first sample image is as follows: selecting, by a physician, a tumor region in a WSI image, and then selecting a patch image from the tumor region as the first sample image.

Figure 5:
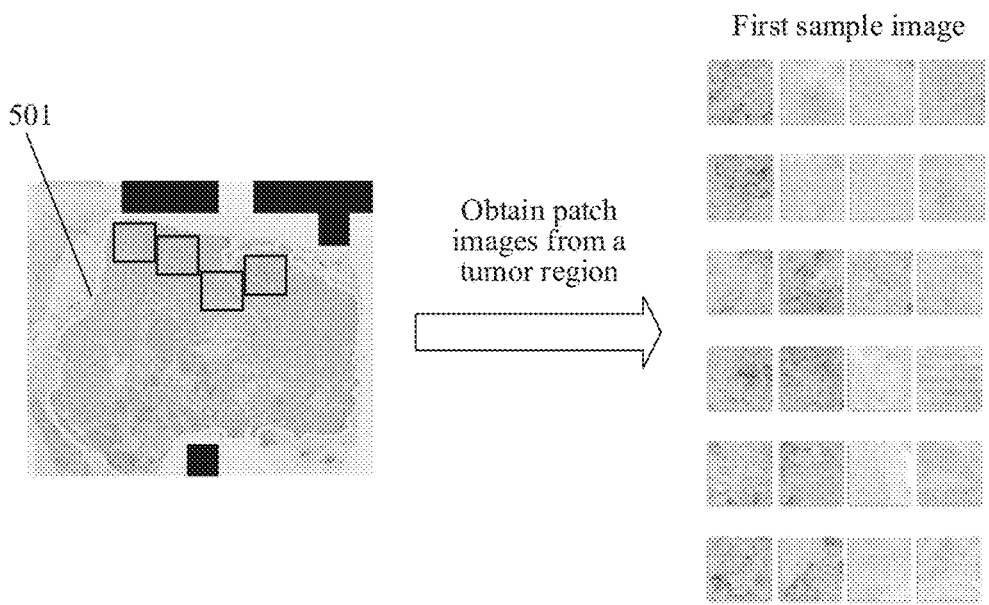
FIG. 5 is a schematic diagram of a process of obtaining a first sample image according to an embodiment of this disclosure.

Exemplarily, a process of obtaining a first sample image is shown in FIG. 5. In FIG. 5, a region within a contour 501 is the tumor region, and a plurality of representative patch images (which are images in black boxes) are selected from the tumor region as the first sample images. Exemplarily, there are 109 first sample images. The size of the WSI image is 50000×50000 (pixels), 0.344 μm/pixel (microns per pixel). The size of each patch image is 2160×2160 (pixels), 0.524 μm/pixel.

After the first sample image is obtained, the first standard region proportion corresponding to the first objects in the first sample image is obtained. Exemplarily, the first standard region proportion corresponding to the first objects in the first sample image is obtained by manually scoring the proportion of the region where the first objects in the first sample image is located in the first sample image. For example, an online scoring platform is provided, so that an expert can score the first sample image through the online scoring platform. Exemplarily, a plurality of experts are invited to score the same batch of images, to avoid some incidental errors. A score corresponding to each first sample image is approved by all the experts, and the score approved by all the experts is the first standard region proportion corresponding to the first objects in the first sample image. Exemplarily, the first standard region proportion corresponding to the first objects in the first sample image is a gold standard corresponding to the first sample image. The gold standard is a medical term for accurately distinguishing whether a test subject suffers from a certain disease. For example, the first sample image may be obtained by performing image acquisition on a pathology slide, a tissue slide, and the like, the slide being from the test subject.

In step 402, a standard region segmentation result corresponding to the first sample image is obtained based on the first standard region proportion, the standard region segmentation result being used for indicating a region of the first objects in the first sample image.

The first standard region proportion is used for indicating a proportion of the region where the first objects in the first sample image is located in the first sample image. As described above, the first standard region proportion is manually labeled and is difficult to be labeled, which may cause the first standard region proportion to be insufficiently accurate. As a result, the first standard region proportion cannot provide effective supervision for training to obtain the first target segmentation model having a better segmentation effect. In other words, the first standard region proportion can provide supervision for training the first target segmentation model to some extent, but the segmentation effect of the first target segmentation model obtained through training may be insufficiently good due to insufficient supervision. Therefore, after the first standard region proportion corresponding to the first objects in the first sample image is obtained, the standard region segmentation result corresponding to the first sample image needs to be further obtained according to the first standard region proportion, so that effective supervision may be provided to the process of obtaining a first target segmentation model through training by using the standard region segmentation result corresponding to the first sample image.

The standard region segmentation result corresponding to the first sample image is used for more accurately indicating the region of the first objects in the first sample image. Exemplarily, the first standard region proportion corresponding to the first objects in the first sample image is referred to as a text labeling corresponding to the first sample image, and the standard region segmentation result corresponding to the first sample image is referred to as a pixel-level labeling corresponding to the first sample image. In other words, in this embodiment of this disclosure, the text labeling corresponding to the first sample image is converted into the pixel-level labeling, to provide effective supervision to a process of obtaining a first target segmentation model by using the pixel-level labeling.

In an implementation, the process of obtaining a standard region segmentation result corresponding to the first sample image based on the first standard region proportion includes steps 4021 and 4022.

Step 4021: Invoke at least one second target segmentation model to perform region segmentation on the first sample image, to obtain at least one candidate region segmentation result, the at least one second target segmentation model being obtained by training based on a second sample image and a standard region division image corresponding to the second sample image, and the standard region division image corresponding to the second sample image being obtained based on a second standard region proportion corresponding to the first objects in the second sample image.

The second sample image is of the same type as the first sample image. The second standard region proportion corresponding to the first objects in the second sample image is used for indicating a proportion of the region where the first objects in the second sample image is located in the second sample image. The standard region division image corresponding to the second sample image is used for roughly indicating the region of the first objects in the second sample image. At least one second target segmentation model is obtained through training based on the second sample image and the standard region division image corresponding to the second sample image, the at least one second target segmentation model has a function of roughly segmenting the region of the first objects in the first sample image.

Before step 4021 is implemented, it is necessary to obtain at least one second target segmentation model through training. In an implementation, the at least one second target segmentation model includes at least one second target segmentation model respectively corresponding to a reference number of second initial segmentation models. In this case, a process of obtaining at least one second target segmentation model through training includes steps 4020A and 4020B.

Step 4020A: Obtain the standard region division image corresponding to the second sample image based on the second standard region proportion.

Figure 6:
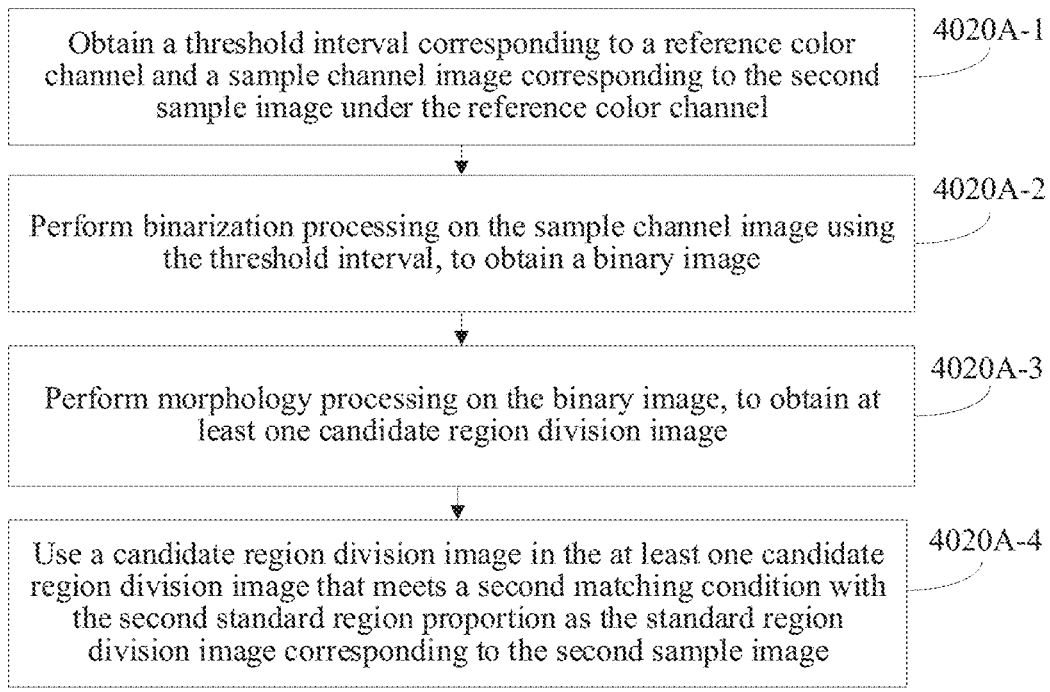
FIG. 6 is a flowchart of obtaining a standard region division image corresponding to a second sample image based on a second standard region proportion according to an embodiment of this disclosure.

The standard region division image corresponding to the second sample image is used for roughly labeling the region of the first objects in the second sample image. In an implementation, referring to FIG. 6, a process of obtaining the standard region division image corresponding to the second sample image based on the second standard region proportion includes steps 4020A-1 to 4020A-4.

Step 4020A-1: Obtain a threshold interval corresponding to a reference color channel and a sample channel image corresponding to the second sample image under the reference color channel.

The threshold interval corresponding to the reference color channel is used for performing binarization processing on the sample channel image corresponding to the second sample image under the reference color channel, to preliminarily divide the region of the first objects in the second sample image.

The reference color channel is a color channel in a color space. The reference color channel is empirically set, or is flexibly adjusted according to the application scenario. This is not limited in the embodiments of this disclosure. Exemplarily, the reference color channel is an H channel, an E channel, or a DAB channel in the HED color space; the reference color channel is an R channel, a G channel, or a B channel in the RGB color space; or the reference color channel is an H channel, an S channel, or a V channel in the HSV color space.

In an implementation, the threshold interval corresponding to the reference color channel is obtained based on the first reference image excluding the first objects and the second reference image including the first objects, to ensure that binarization processing can be performed on the second sample image more accurately according to the threshold interval corresponding to the reference color channel, thereby obtaining a binary image for more accurately performing preliminary division on the region of the first objects in the second sample image. A process of obtaining a threshold interval corresponding to a reference color channel includes steps 1 to 4.

Step 1: Obtain a first channel image corresponding to a first reference image under the reference color channel and a second channel image corresponding to a second reference image under the reference color channel.

The first reference image does not include the first objects, and the second reference image includes the first objects.

The first reference image is an image excluding the first objects. Exemplarily, the first reference image is selected from an image in which the standard region proportion corresponding to the first objects is 0%. The second reference image is an image including the first objects. Exemplarily, the second reference image is selected from an image in which the standard region proportion corresponding to the first objects is greater than 0%.

In an exemplary embodiment, in a process of selecting the second reference image, an image in which the standard region proportion corresponding to the first objects is greater than a reference proportion is selected from the image in which the standard region proportion corresponding to the first objects is greater than 0% as the second reference image, to increase differences between the second reference image and the first reference image, thereby more accurately determining the threshold interval corresponding to the reference color channel. The reference proportion is a proportion greater than 0%. The reference proportion is empirically set, or is flexibly adjusted according to the application scenario, for example, the reference proportion is 10%. In other words, the second reference image is selected from the image in which the standard region proportion corresponding to the first objects is greater than 10%.

There are one or more first reference images, and there are one or more second reference images. The quantities of first reference images and second reference images may be the same or different. This is not limited in the embodiments of this disclosure.

After the first reference image is obtained, the first channel image corresponding to the first reference image under the reference color channel is obtained. In an implementation, the reference color channel may be a color channel in a color space corresponding to the first reference image, or may not be the color channel in the color space corresponding to the first reference image. This is not limited in the embodiments of this disclosure.

When the reference color channel is the color channel in the color space corresponding to the first reference image, an image of the reference color channel is directly decomposed from the first reference image, and the decomposed image is used as the first channel image. When the reference color channel is not the color channel in the color space corresponding to the first reference image, color space conversion is performed on the first reference image, so that a color space corresponding to a converted first reference image is a color space of the reference color channel, then an image of the reference color channel is decomposed from the converted first reference image, and the decomposed image is used as the first channel image.

Figure 7:
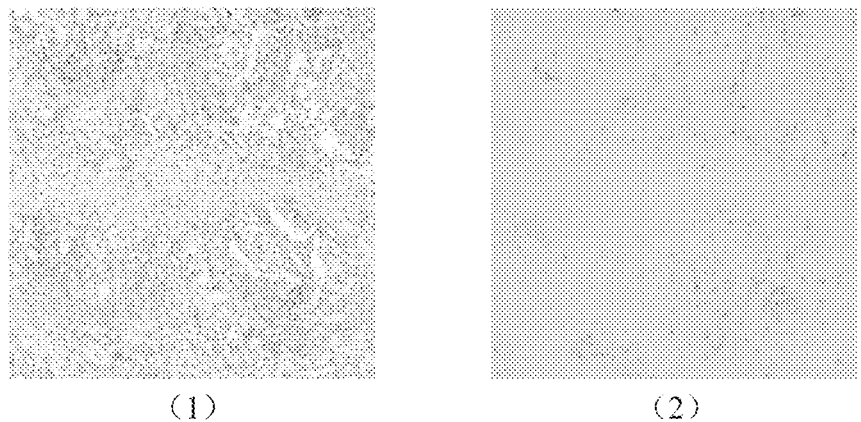
FIG. 7 is a schematic diagram of a first reference image and a first channel image corresponding to the first reference image under a DAB channel according to an embodiment of this disclosure.

Exemplarily, using an example in which the reference color channel is the DAB channel in the HED color space, a first reference image and a first channel image corresponding to the first reference image under the DAB channel are shown in FIG. 7. (1) of FIG. 7 is the first reference image, and (2) of FIG. 7 is the first channel image corresponding to the first reference image under the DAB channel.

There are one or more first reference images, and a first channel image is obtained according to each first reference image. In other words, there are one or more first channel images.

A principle of a second channel image corresponding to the second reference image under the reference color channel is the same as a principle of obtaining the first channel image corresponding to the first reference image under the reference color channel. There are one or more second reference images, and a second channel image is obtained according to each second reference image. In other words, there are one or more second channel images.

Step 2: Obtain a first pixel value distribution of the first channel image.

The first pixel value distribution is used for indicating a distribution of pixel values in the first reference image excluding the first objects. In an implementation, a manner of obtaining a first pixel value distribution of the first channel image is as follows: collecting statistics on pixels corresponding to each pixel value based on pixel values respectively corresponding to the pixels in the first channel image, and obtaining the first pixel value distribution according to a quantity of pixels corresponding to each pixel value.

A representation form of the first pixel value distribution is not limited in this embodiment of this disclosure. Exemplarily, the first pixel value distribution is represented as a histogram, or the first pixel value distribution is represented as a curve. Exemplarily, in a process of representing the first pixel value distribution by using the histogram or the curve, a horizontal coordinate of the histogram or the curve is a pixel value, and a vertical coordinate is the quantity of pixels.

When there are a plurality of first reference images, there are a plurality of first channel images, and the first pixel value distribution is a pixel value distribution obtained according to all first channel images.

Step 3: Obtain a second pixel value distribution of the second channel image.

The second pixel value distribution is used for indicating a distribution of pixel values in the second reference image including the first objects. A principle of obtaining the second pixel value distribution of the second channel image is the same as a principle of obtaining the first pixel value distribution of the first channel image described in step 2.

Step 4: Determine the threshold interval corresponding to the reference color channel based on the first pixel value distribution and the second pixel value distribution.

Since the first pixel value distribution is used for indicating a distribution of pixel values in the first reference image excluding the first objects, and the second pixel value distribution is used for indicating a distribution of pixel values in the second reference image including the first objects, the threshold interval determined based on the first pixel value distribution and the second pixel value distribution can perform binarization processing on a sample channel image corresponding to the second sample image, to more accurately perform preliminary division on the region of the first objects in the second sample image.

In an implementation, a manner of determining the threshold interval corresponding to the reference color channel based on the first pixel value distribution and the second pixel value distribution is as follows: determining a difference pixel value distribution between the first pixel value distribution and the second pixel value distribution, and using a pixel value interval corresponding to the difference pixel value distribution as the threshold interval corresponding to the reference color channel. The difference pixel value distribution between the first pixel value distribution and the second pixel value distribution can indicate pixel values of pixels in the region of the first objects to a greater extent.

Figure 8:
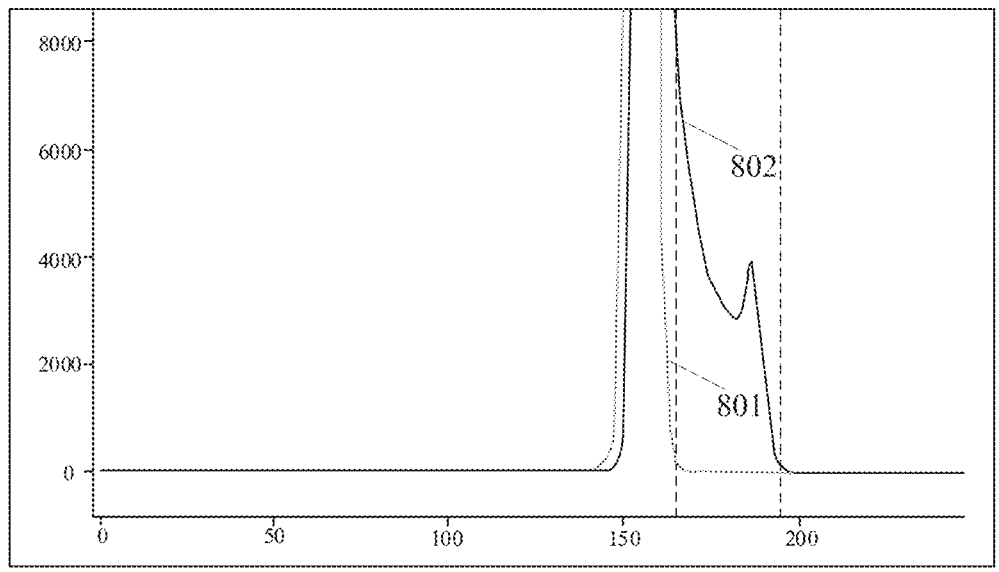
FIG. 8 is a schematic diagram of a first pixel value distribution and a second pixel value distribution according to an embodiment of this disclosure.

Exemplarily, when the first objects are stained cells, pixel values in the pixel value interval corresponding to the difference pixel value distribution are pixel values of pixels in a region of the stained cells, and the pixel value interval corresponding to the difference pixel value distribution is used as the threshold interval corresponding to the reference color channel, so that the region of the stained cells can be preliminarily divided by using the threshold interval more accurately. For example, the first pixel value distribution and the second pixel value distribution are shown in FIG. 8. In FIG. 8, a curve 801 represents the first pixel value distribution, and a curve 802 represents the second pixel value distribution. The difference pixel value distribution between the first pixel value distribution and the second pixel value distribution can be determined according to the curve 801 and the curve 802. The difference pixel value distribution between the first pixel value distribution and the second pixel value distribution are marked and determined by using two vertical dotted lines. A position between the two vertical dotted lines is a position of a pixel value interval [165,195], and [165,195] is used as the threshold interval corresponding to the reference color channel.

Steps 1 to 4 described above are exemplary descriptions of obtaining a threshold interval corresponding to a reference color channel, and the embodiments of this disclosure are not limited thereto. Exemplarily, the threshold interval corresponding to the reference color channel is empirically set.

A process of obtaining a sample channel image corresponding to the second sample image under the reference color channel is described below. When the reference color channel is the color channel in the color space corresponding to the first sample image, an image of the reference color channel is directly decomposed from the first sample image, and the decomposed image is used as the sample channel image. When the reference color channel is not the color channel in the color space corresponding to the first sample image, color space conversion is performed on the first sample image, so that a color space corresponding to a converted first sample image is a color space of the reference color channel, then an image of the reference color channel is decomposed from the converted first sample image, and the decomposed image is used as the sample channel image.

Step 4020A-2: Perform binarization processing on the sample channel image by using the threshold interval, to obtain a binary image.

After the threshold interval corresponding to the reference color channel is obtained, binarization processing is performed on the sample channel image by using the threshold interval, and an image on which binarization processing is performed is used as the binary image. The region of the first objects in the second sample image can be preliminarily divided from the binary image.

In an implementation, a process of performing binarization processing on the sample channel image by using the threshold interval is as follows: setting a pixel value of a pixel as a first pixel value when the pixel value of the pixel in the sample channel image is within the threshold interval; and setting the pixel value of the pixel as a second pixel value when the pixel value of the pixel in the sample channel image is not within the threshold interval. The binary image is obtained after pixel values of all pixels in the sample channel image are adjusted in such a manner. The first pixel value and the second pixel value are empirically set or are flexibly adjusted according to the application scenario. Exemplarily, the first pixel value is 255, and the second pixel value is 0. Exemplarily, in the binary image, pixels including the first pixel value are represented in white, and pixels including the second pixel value are represented in black.

Figure 9:
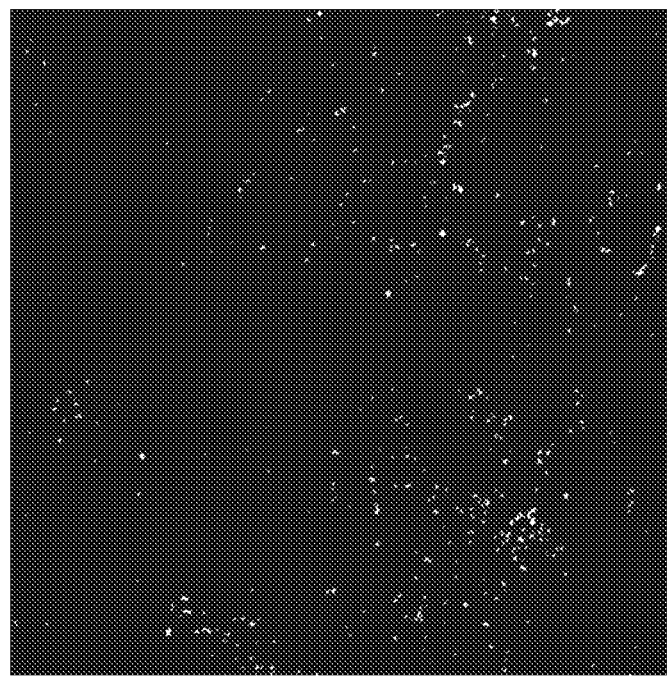
FIG. 9 is a schematic diagram of a binary image according to an embodiment of this disclosure.

For example, a binary image obtained after binarization processing is performed on the sample channel image is shown in FIG. 9. In FIG. 9, the region of the first objects in the second sample image that is preliminarily divided is represented as a white region.

Step 4020A-3: Perform morphology processing on the binary image, to obtain at least one candidate region division image.

The region of the first objects in the second sample image that is preliminarily divided from the binary image may not be accurate. In view of this, morphology processing needs to be performed on the binary image, to obtain at least one candidate region division image. The region of the first objects in the second sample image can be divided from each candidate region division image, and both a candidate region division image that is accurately divided and a candidate region division image that is not accurately divided may exist in the at least one candidate region division image. A candidate region division image that is accurately divided is selected from the at least one candidate region division image as the standard region division image corresponding to the second sample image.

In an implementation, after the binary image is obtained, a predicted region proportion corresponding to the first objects in the second sample image is determined based on the binary image. The predicted region proportion corresponding to the first objects in the second sample image is a proportion of the region of the first objects in the second sample image that is predicted according to the region of the first objects in the second sample image divided from the binary image. Exemplarily, a manner of determining, based on the binary image, a predicted region proportion corresponding to the first objects in the second sample image is as follows: comparing the region of the first objects in the second sample image divided from the binary image with a total region of the binary image, to obtain the predicted region proportion corresponding to the first objects in the second sample image. An area of the total region of the binary image is the same as an area of a total region of the second sample image.

The predicted region proportion corresponding to the first objects in the second sample image may be less than the second standard region proportion, or may be equal to the second standard region proportion, or may be greater than the second standard region proportion. This is not limited in the embodiments of this disclosure. The description is made in this embodiment of this disclosure by using an example in which the predicted region proportion corresponding to the first objects in the second sample image is less than or greater than the second standard region proportion. The binary image is directly used as the standard region division image corresponding to the second sample image when the predicted region proportion corresponding to the first objects in the second sample image is equal to the second standard region proportion.

In an implementation, when the predicted region proportion is less than the second standard region proportion, it indicates that the region of the first objects in the second sample image divided from the binary image is less than a region where the first objects in the second sample image are actually located. In this case, a process of performing morphology processing on the binary image, to obtain at least one candidate region division image is as follows: expanding, when the predicted region proportion is less than the second standard region proportion, the binary image by using a reference expansion kernel, to obtain the at least one candidate region division image.

The reference expansion kernel is configured to perform expansion processing on the binary image, to expand the region of the first objects in the second sample image divided from the binary image. The size and type of the reference expansion kernel is empirically set, or is flexibly adjusted according to the application scenario. This is not limited in the embodiments of this disclosure. Exemplarily, the reference expansion kernel is a circle having a radius of 1 pixel, or the reference expansion kernel is a square having a side length of 3 pixels.

The expanding the binary image by using a reference expansion kernel, to obtain the at least one candidate region division image is an iterative process: expanding the binary image by using the reference expansion kernel, to obtain the first candidate region division image; performing expansion processing on a previous candidate region division image by using the reference expansion kernel, to obtain a next candidate region division image, and repeatedly performing expansion processing until the required at least one candidate region division image is obtained. A quantity of candidate region division images is not limited in this embodiment of this disclosure. How many candidate region division images are required, and how many times of expansion processing is iteratively performed by using the reference expansion kernel. Exemplarily, a process of performing expansion processing on the binary image by using the reference expansion kernel is a process of convolving the binary image by using the reference expansion kernel, to expand the region of the first objects in the second sample image divided from the binary image.

Exemplarily, when the predicted region proportion is less than the second standard region proportion (for example, the predicted region proportion is 0.6%, and the second standard region proportion is 2.0%), the region where the first objects in the second sample image are actually located may be regarded as a sum of the region of the first objects in the second sample image divided from the binary image and a certain surrounding region. Therefore, the process of performing expansion processing on the binary image may be regarded as a process of performing pixel-by-pixel expansion on the region of the first objects in the second sample image divided from the binary image, to obtain the certain surrounding region.

In an exemplary embodiment, the region of the first objects in the second sample image divided from the binary image may be "enlarged" by performing expansion processing by using the reference expansion kernel, and background points in contact with the region of the first objects in the second sample image divided from the binary image are merged into the region of the first objects in the second sample image, so that a boundary of the region of the first objects in the second sample image expands outward.

Exemplarily, the reference expansion kernel used during expansion processing is a disk (1) (which is a circle having a radius of 1 pixel), to a minimum degree of expansion at each time. The logic of performing expansion processing by using an expansion kernel of the disk (1) is as follows:

kernel=disk(1). astype(np. Uint8) //Convert a reference expansion kernel into to an integer
mask_ic=cv2.dilate (mask_init, kernel, iterations=ITERATION)//Iterate to obtain at least one candidate region division image where ITERATION indicates a quantity of iterations, that is, a quantity of candidate region division images that are required, and exemplarily, the quantity of iterations is 5, and the quantity of iterations can be flexibly changed according to an actual condition; mask_init represents a binary image; and mask_ic represents a candidate region division image obtained after each expansion processing is performed.

In an implementation, when the predicted region proportion is greater than the second standard region proportion, it indicates that the region of the first objects in the second sample image divided from the binary image is greater than a region where the first objects in the second sample image are actually located. In this case, a process of performing morphology processing on the binary image, to obtain at least one candidate region division image is as follows: reducing, when the predicted region proportion is greater than the second standard region proportion, the binary image by using a reference reduction kernel, to obtain the at least one candidate region division image.

The reference reduction kernel is configured to perform reduction processing on the binary image, to reduce the region of the first objects in the second sample image divided from the binary image. The size and type of the reference reduction kernel is empirically set, or is flexibly adjusted according to the application scenario. This is not limited in the embodiments of this disclosure. Exemplarily, the reference reduction kernel is a circle having a radius of 1 pixel; or the reference reduction kernel is a square having a side length of 3 pixels.

The reducing the binary image by using a reference reduction kernel, to obtain the at least one candidate region division image is an iterative process: reducing the binary image by using the reference reduction kernel, to obtain the first candidate region division image; performing reduction processing on a previous candidate region division image by using the reference reduction kernel, to obtain a next candidate region division image, and repeatedly performing expansion processing until the required at least one candidate region division image is obtained. How many candidate region division images are required, and how many times of reduction processing is iteratively performed by using the reference reduction kernel. Exemplarily, a process of performing reduction processing on the binary image by using the reference reduction kernel is a process of convolving the binary image by using the reference reduction kernel, to reduce the region of the first objects in the second sample image divided from the binary image.

In an exemplary embodiment, the region of the first objects in the second sample image divided from the binary image may be "reduced" by performing reduction processing by using the reference reduction kernel, so that a boundary of the region of the first objects in the second sample image divided from the binary image is reduced outward.

After at least one candidate region division image is obtained, a candidate region proportion corresponding to the first objects in the second sample image can be obtained according to a region of the first objects in the second sample image divided from each candidate region division image. For a manner of obtaining a candidate region proportion corresponding to the first objects in the second sample image, reference may be made to the manner of obtaining a predicted region proportion corresponding to the first objects in the second sample image.

Figure 10:
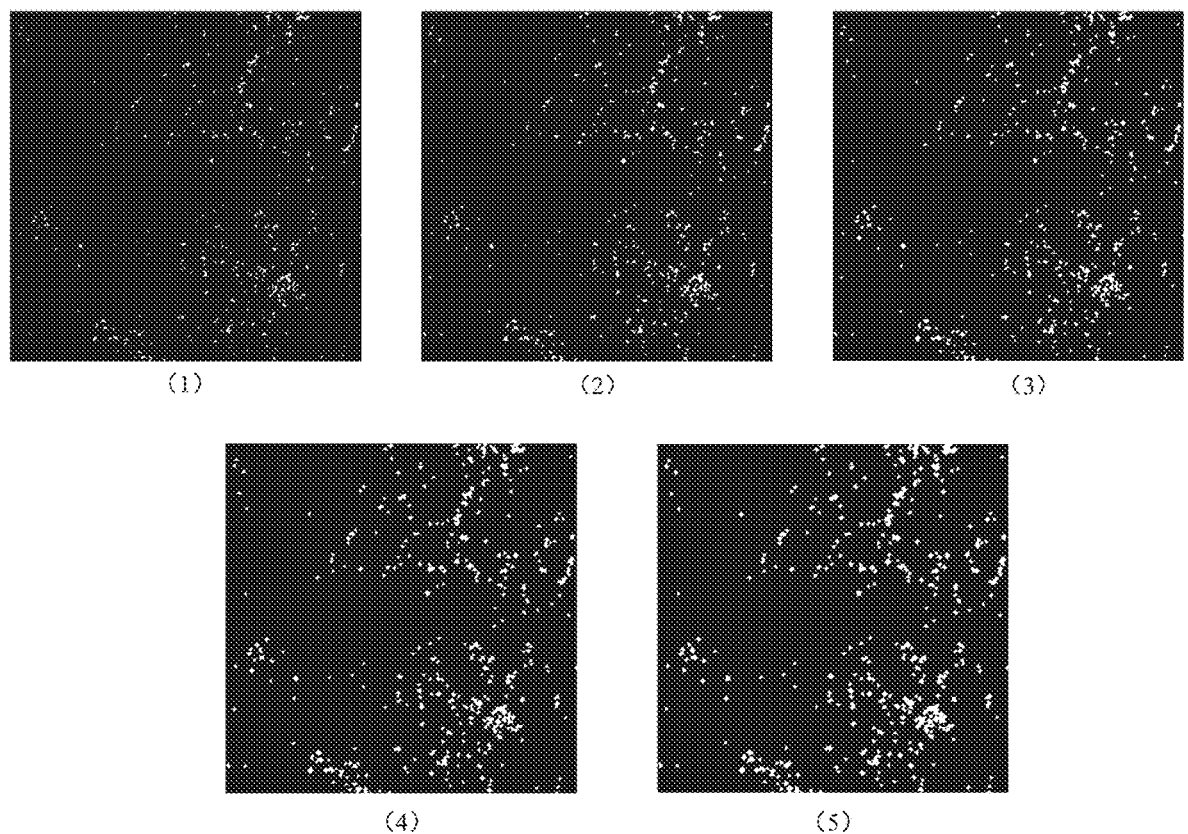
FIG. 10 is a schematic diagram of five candidate region division images obtained by iteratively performing expansion processing for five times according to an embodiment of this disclosure.

Exemplarily, using an example in which the quantity of iterations is 5, based on a binary image shown in FIG. 9, 5 candidate region division images obtained after expansion processing is iteratively performed for 5 times are respectively shown in (1) to (5) of FIG. 10. A white region in FIG. 10 represents a region of the first objects that is divided. According to FIG. 10, as the quantity of iterations increases, the divided region of the first objects gradually expands.

Exemplarily, a candidate region proportion determined based on a region of the first objects divided from the candidate region division image shown in (1) of FIG. 10 is 1.1%; a candidate region proportion determined based on a region of the first objects divided from the candidate region division image shown in (2) of FIG. 10 is 1.8%; a candidate region proportion determined based on a region of the first objects divided from the candidate region division image shown in (3) of FIG. 10 is 2.5%; a candidate region proportion determined based on a region of the first objects divided from the candidate region division image shown in (4) of FIG. 10 is 3.4%; and a candidate region proportion determined based on a region of the first objects divided from the candidate region division image shown in (5) of FIG. 10 is 4.3%.

Step 4020A-4: Use a candidate region division image in the at least one candidate region division image that meets a second matching condition with the second standard region proportion as the standard region division image corresponding to the second sample image.

A candidate region proportion corresponding to the first objects in the second sample image can be determined according to each candidate region division image. In an implementation, an implementation process of step 4020A-4 is as follows: determining at least one candidate region proportion corresponding to the first objects in the second sample image based on the at least one candidate region division image. A candidate region proportion having a minimum difference from the second standard region proportion is used as a first target region proportion, a candidate region division image on which determining the first target region proportion is based is used as a candidate region division image that meets a second matching condition with the second standard region proportion, and the candidate region division image that meets the second matching condition with the second standard region proportion is used as the standard region division image corresponding to the second sample image. Exemplarily, an absolute value of a difference between each candidate region proportion and the second standard region proportion is determined, to obtain absolute values. A candidate region proportion corresponding to a minimum absolute value in the absolute values is the candidate region proportion having a minimum difference from the second standard region proportion.

Exemplarily, for 5 candidate region division images in FIG. 10, a candidate region proportion (1.8%) obtained based on a candidate region division image (that is, the candidate region division image shown in (2) of FIG. 10) obtained in the second iteration is closest to the second standard region proportion (2%), and the candidate region division image obtained in the second iteration is used as the standard region division image corresponding to the second sample image.

Exemplarily, the standard region division image corresponding to the second sample image may be regarded as a box-level labeling. In the standard region division image, each pixel is represented as a box, the shape of the box being related to the type and size of a kernel used during morphology processing. For example, according to FIG. 10, expansion processing is performed by using a circular expansion kernel having a radius of 1 pixel, so that each pixel can be represented as a diamond box.

Exemplarily, a process of obtaining the standard region division image corresponding to the second sample image based on steps 4020A-1 to 4020A-4 is as follows: (1) Statistically compare the first pixel value distribution of the first reference image excluding the first objects with the second pixel value distribution of the second reference image including the first objects by using prior knowledge and channel images, to determine a threshold interval. (2) Obtain. by using the threshold interval, a binary image that can be used for preliminarily dividing the region of the first objects in the second sample image, and supervising by using morphology processing and the second standard region proportion based on the binary image, to obtain a box-level labeling (that is, the standard region division image).

In steps 4020A-1 to 4020A-4 described above, an example in which there is one second sample image is used to describe the process of obtaining the standard region division image corresponding to the second sample image. When there are a plurality of second sample images, for each second sample image, a standard region division image corresponding to the second sample image needs to be obtained in a manner in steps 4020A-1 to 4020A-4.

Step 4020B: Separately train the reference number of second initial segmentation models based on the second sample image and the standard region division image, to obtain at least one second target segmentation model corresponding to the reference number of second initial segmentation models and obtained by training for different quantities of rounds.

The reference number is empirically set, or is flexibly adjusted according to the application scenario. This is not limited in the embodiments of this disclosure. Exemplarily, the reference number is 2, or the reference number is 3 and the like.

All second sample images and all standard region division images corresponding to all the second sample images, or a second sample image that meets a selection condition and a standard region division images corresponding to the second sample image that meets the selection condition may be used for training of the reference number of second initial segmentation models. This is not limited in the embodiments of this disclosure. Exemplarily, the second sample image meeting the selection condition is a second sample image in which a difference between a region proportion determined based on the corresponding standard region division image and the second standard region proportion is not greater than a difference threshold. The difference threshold is empirically set, or is flexibly adjusted according to the application scenario. This is not limited in the embodiments of this disclosure. For example, the difference threshold is 0.6%.

Exemplarily, during actual processing, there are 109 second sample images, second sample images meeting the selection condition account for about 76% (that is, 83 second sample images), and remaining second sample images cannot obtain relatively accurate standard region division images. In the process of training the reference number of second initial segmentation models, the second sample image that have not obtained the relatively accurate standard region division images are discarded, which is conducive to improving processing performance of at least one second target segmentation model obtained through training.

The reference number of second initial segmentation models are different segmentation models, so that different segmentation models complement segmentation performance. Exemplarily, the reference number is 2, two second initial segmentation models are respectively a Fully Convolutional Dense Net (FC-Dense Net) model and a Mobile Net model. The network structure of the FC-Dense Net model is relatively complex but slow to process, and the network structure of the Mobile Net model is relatively simple but fast to process. Certainly, the reference number may also be another value, and the reference number of second initial segmentation models may also be other segmentation models. The second sample images on which training different second initial segmentation models is based may be the same or different. This is not limited in the embodiments of this disclosure.

Each second initial segmentation model in the reference number of second initial segmentation models is trained, and at least one second target segmentation model corresponding to the each second initial segmentation model and obtained by training for different quantities of rounds can be obtained. Exemplarily, training round may be referred to as an epoch (period), and the at least one second target segmentation model corresponding to the each second initial segmentation model is obtained by training the each second initial segmentation model for different epochs.

Exemplarily, assuming that there are 10 second sample images for training one second initial segmentation model, a round of training on the second initial segmentation model is completed when model parameters of the second initial segmentation model are updated once by using the 10 second sample images. In a process of updating the model parameters of the second initial segmentation model once by using the 10 second sample images, one or more second sample images may be selected for update, until the model parameters of the second initial segmentation model is updated once by using the 10 second sample images.

Exemplarily, a process of training a second initial segmentation model based on the second sample image and the standard region division image, to obtain at least one second target segmentation model corresponding to the second initial segmentation model and obtained by training for different quantities of rounds is as follows: training the second initial segmentation model based on the second sample image and the standard region division image for a first reference number of rounds, to obtain a first reference number of candidate segmentation models corresponding to the second initial segmentation model. Last second reference number of candidate segmentation models in the first reference number of candidate segmentation models corresponding to the second initial segmentation model are used as the second target segmentation models corresponding to the second initial segmentation model. That is, there are a second reference number of at least one second target segmentation model corresponding to the each second initial segmentation model and obtained by training for different quantities of rounds. The first reference number and the second reference number are empirically set, or are flexibly adjusted according to the application scenario. For example, first reference number is 300, and the second reference number is 100.

The process of training each second initial segmentation model based on the second sample image and the standard region division image is a supervisory training process. The standard region division image is used for providing supervisory signals.

For different second initial segmentation models, the first reference number may vary or remain unchanged. The second reference number can also vary or remain unchanged. This is not limited in the embodiments of this disclosure.

Exemplarily, in a process of obtaining at least one second target segmentation model through training, there are 83 second sample images that are used, there are 26 verification images, and the size of each image is 1080*1080 (pixels), 1.048 μm/pixel (microns per pixel). In the training process, the second initial segmentation model is first trained based on the second sample image to obtain a trained second initial segmentation model, and then the trained second initial segmentation model is verified through the verification image. In the verification process, the verification image is inputted into the trained second initial segmentation model, and then the trained second initial segmentation model segments a region of the first objects in the verification image and outputs a segmentation result. The verification is successful when accuracy of the segmentation result meets requirements, and the trained second initial segmentation model may be used as the second target segmentation model. The verification fails when the accuracy of the segmentation result does not meet the requirements, and it is necessary to continue to train and optimize the trained second initial segmentation model.

The second sample image may be the same as the first sample image, or may be different from the second sample image. When the second sample image is different from the first sample image, before step 4020A is implemented, it is necessary to first obtain a second sample image and a second standard region proportion corresponding to first objects in the second sample image. For a manner of obtaining a second sample image and a second standard region proportion corresponding to first objects in the second sample image, reference may be made to the manner of obtaining a first sample image and a first standard region proportion corresponding to first objects in the first sample image in step 401. After the second sample image and the second standard region proportion corresponding to the first objects in the second sample image are obtained, steps 4020A and 4020B are performed to obtain at least one second target segmentation model, and then step 4021 is performed.

When the second sample image is the same as the first sample image, after the first sample image and the first standard region proportion corresponding to the first objects in the first sample image are obtained based on step 401, the first sample image is used as the second sample image, the first standard region proportion corresponding to the first objects in the first sample image is used as the second standard region proportion corresponding to the first objects in the second sample image, steps 4020A and 4020B are directly performed to obtain at least one second target segmentation model, and then step 4021 is performed.

After the at least one second target segmentation model is obtained through training, step 4021 may be performed, that is, the at least one second target segmentation model is invoked to perform region segmentation on the first sample image, to obtain at least one candidate region segmentation result.

Each of the at least one second target segmentation model is invoked to perform region segmentation on the first sample image, so that a candidate region segmentation result can be obtained. That is, a quantity of candidate region segmentation results is the same as that of the second target segmentation models. Exemplarily, the at least one second target segmentation model includes at least one second target segmentation model respectively corresponding to a reference number of second initial segmentation models, to ensure comprehensiveness of the candidate region segmentation result. Each candidate region segmentation result is used for indicating a region of the first objects in the first sample image, and regions of the first objects in the first sample images indicated by different candidate region segmentation results may be different.

For example, using an example in which the reference number is 2, the 2 second initial segmentation models are separately trained for 300 epochs, and segmentation models obtained by training each second initial segmentation models for the last 100 epochs are used as 100 second target segmentation models corresponding to the each second initial segmentation model. The segmentation models obtained by training for the last 100 epochs have better segmentation accuracy. Based on this, each second initial segmentation model corresponds to 100 second target segmentation models, and 2 second initial segmentation models correspond to a total of 200 second target segmentation models. The 200 second target segmentation models are invoked to perform region segmentation on the first sample image, to obtain 200 candidate region segmentation results.

Step 4022: Use a candidate region segmentation result in the at least one candidate region segmentation result that meets a first matching condition with a first standard region proportion as the standard region segmentation result corresponding to the first sample image.

Each candidate region segmentation result is used for indicating a region of the first objects in the first sample image, and a candidate region proportion corresponding to the first objects in the first sample images can be obtained according to the region of the first objects in the first sample image that is indicated by each candidate region segmentation result.

In an implementation, an implementation process of step 4022 is as follows: determining at least one candidate region proportion corresponding to the first objects in the first sample image based on the at least one candidate region division result. A candidate region proportion having a minimum difference from the first standard region proportion is used as a second target region proportion, a candidate region segmentation result on which determining the second target region proportion is based is used as a candidate region segmentation result that meets a first matching condition with the first standard region proportion, and the candidate region segmentation result that meets the first matching condition with the first standard region proportion is used as the standard region segmentation result corresponding to the first sample image. Exemplarily, an absolute value of a difference between each candidate region proportion and the first standard region proportion is determined, to obtain absolute values. A candidate region proportion used for determining a minimum absolute value in the absolute values is a candidate region proportion having a minimum difference from the first standard region proportion, that is, a second target region proportion.

For example, when there are 200 second target segmentation models, 200 candidate region segmentation results can be obtained, a candidate region segmentation result is selected from the 200 candidate region segmentation results by using the first standard region proportion corresponding to the first objects in the first sample image and is used as the standard region segmentation result corresponding to the first sample image, and the selected candidate region segmentation result can determine a candidate region proportion closest to (that is, having a minimum difference from) the first standard region proportion. Exemplarily, the standard region segmentation result corresponding to the first sample image may be regarded as a pixel-level labeling corresponding to the first sample image.

Exemplarily, a second target segmentation model trained based on a box-level labeling (that is, the standard region division image) is invoked, and a region of the first objects that is indicated by a standard region segmentation result predicted by the second target segmentation model is more natural than an edge of a region of the first objects that is indicated by the box-level labeling.

Figure 11:
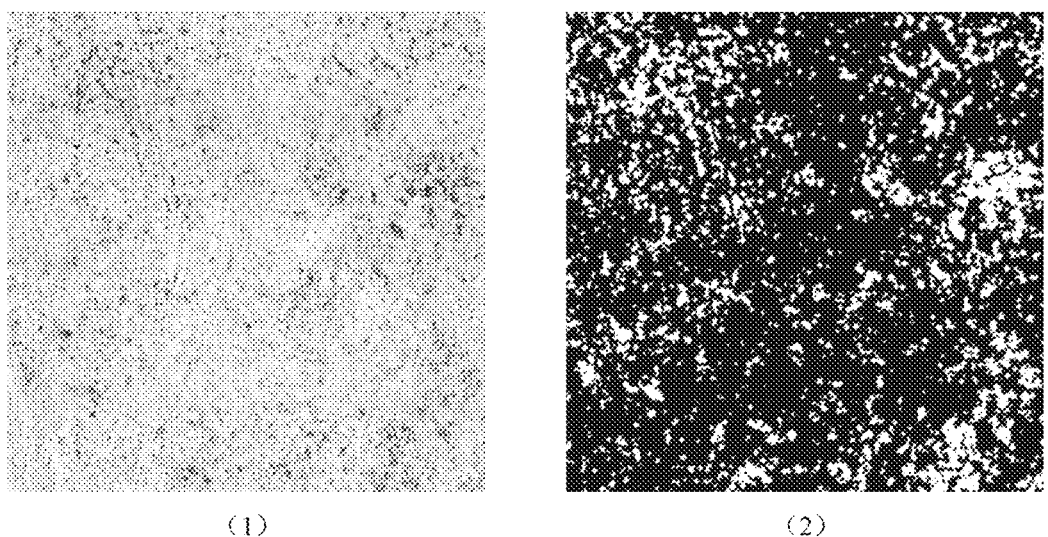
FIG. 11 is a schematic diagram of a first sample image and a standard region segmentation result corresponding to the first sample image represented in a form of an image according to an embodiment of this disclosure.

For example, as shown in FIG. 11, a first sample image and a standard region segmentation result corresponding to the first sample image represented in a form of an image are respectively shown in (1) and (2) of FIG. 11.

Figure 12:
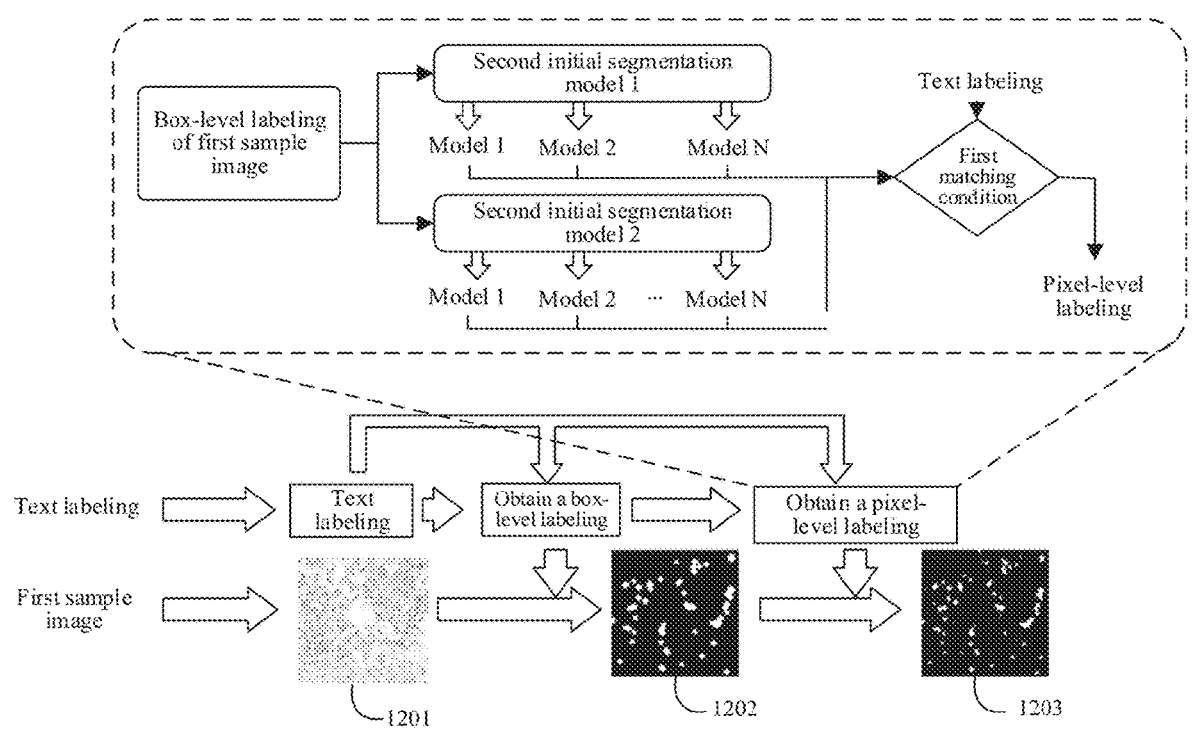
FIG. 12 is a schematic diagram of a process of obtaining a standard region segmentation result corresponding to a first sample image according to an embodiment of this disclosure.

Exemplarily, using an example in which the second sample image as the same as the first sample image, a process of obtaining a standard region segmentation result corresponding to the first sample image is shown in FIG. 12: obtaining a first sample image 1201 and a text labeling corresponding to the first sample image (that is, a first standard region proportion corresponding to first objects in the first sample image); obtaining a box-level labeling corresponding to the first sample image (that is, a standard region division image corresponding to the first sample image) based on the text labeling corresponding to the first sample image, the box-level labeling displayed in the form of an image being represented as 1202; and obtaining a pixel-level labeling corresponding to the first sample image (that is, a standard region segmentation result corresponding to the first sample image) based on the box-level labeling corresponding to the first sample image, the pixel-level labeling displayed in the form of an image being represented as 1203.

In a process of obtaining a pixel-level labeling corresponding to the first sample image based on the box-level labeling corresponding to the first sample image, 2 second initial segmentation models (a second initial segmentation model 1 and a second initial segmentation model 2) are first trained based on the first sample image and the box-level labeling corresponding to the first sample image, to obtain N (where N is an integer not less than 1) second target segmentation models corresponding to the 2 second initial segmentation models and obtained by training for different quantities of rounds. N second target segmentation models respectively corresponding to the 2 second initial segmentation models are invoked to perform region segmentation on the first sample image, to obtain candidate region segmentation results corresponding to the second target segmentation models. Based on the text labeling corresponding to the first sample image, a candidate region segmentation result in the at least one candidate region segmentation result that meets a first matching condition with a first standard region proportion is used as the pixel-level labeling corresponding to the first sample image.

Steps 4021 and 4022 described above are exemplary descriptions of obtaining a standard region segmentation result corresponding to the first sample image based on the first standard region proportion. The embodiments of this disclosure are not limited thereto. Exemplarily, a manner of obtaining a standard region segmentation result corresponding to the first sample image based on the first standard region proportion is as follows: obtaining a standard region division image corresponding to the first sample image based on the first standard region proportion, and using the standard region division image corresponding to the first sample image as the standard region segmentation result corresponding to the first sample image. Obtaining a standard region segmentation result corresponding to the first sample image is more efficient in such a manner. For an implementation of obtaining a standard region division image corresponding to the first sample image based on the first standard region proportion, reference may be made to the implementation of obtaining the standard region division image corresponding to the second sample image based on the second standard region proportion in step 4020A.

The process of obtaining a standard region segmentation result corresponding to the first sample image is described in this embodiment of this disclosure by using an example in which there is a first sample image. When there are a plurality of first sample images, standard region segmentation results respectively corresponding to the first sample image need to be separately obtained, and then step 403 is performed.

In step 403, a first initial segmentation model is trained based on the first sample image and the standard region segmentation result, to obtain a first target segmentation model.

A process of training a first initial segmentation model based on the first sample image and the standard region segmentation result corresponding to the first sample image is a supervisory training process, and the standard region segmentation result corresponding to the first sample image is used for providing supervisory signals for the supervisory training process.

In an implementation, the training a first initial segmentation model based on the first sample image and the standard region segmentation result, to obtain a first target segmentation model includes but is not limited to the following two manners:

First manner: Directly train a first initial segmentation model based on the first sample image and the standard region segmentation result, to obtain a first target segmentation model.

In such a manner, the first initial segmentation model is invoked to directly perform region segmentation on the first sample image, to obtain a predicted region segmentation result; a loss function is obtained based on the predicted region segmentation result and the standard region segmentation result; and the first initial segmentation model is trained by using the loss function, to obtain the first target segmentation model.

Second manner: Perform attribute transformation on the first sample image, so that an attribute-transformed first sample image has a target visual attribute; and train a first initial segmentation model based on the attribute-transformed first sample image and the standard region segmentation result, to obtain a first target segmentation model.

In such a second manner, before the first initial segmentation model is invoked for processing, attribute transformation is performed on the first sample image, so that the attribute-transformed first sample image has the target visual attribute. A principle of performing attribute transformation on the first sample image, so that an attribute-transformed first sample image has a target visual attribute is the same as the principle of performing attribute transformation on the image, so that an attribute-transformed image has a target visual attribute in the embodiment shown in FIG. 2.

After the attribute-transformed first sample image is obtained, the first initial segmentation model is invoked to perform region segmentation on the attribute-transformed first sample image, to obtain a predicted region segmentation result; a loss function is obtained based on the predicted region segmentation result and the standard region segmentation result; and the first initial segmentation model is trained by using the loss function, to obtain the first target segmentation model. In the second manner, a quantity of first sample images required for training may be reduced, so that convergence is achieved more quickly in the process of training.

Exemplarily, there are 83 first sample images used for training to obtain the first target segmentation model, and there are 36 verification images. For the verification image, reference may be made to the description of training at least one second target segmentation model that is made for the verification images. A 3-Fold (group) method was applied to train the first target segmentation model and test segmentation accuracy of the first target segmentation model. For example, the segmentation accuracy is represented by F1 score. The test results of segmentation accuracy are shown in Table 1. According to the test results in Table 1, the segmentation accuracy and the segmentation stability of the first target segmentation model are good.

TABLE 1

| Test dataset | Segmentation accuracy F1 score |
|---|---|
| Fold 1 | 0.843 |
| Fold 2 | 0.856 |
| Fold 3 | 0.837 |

After a trained first target segmentation model is obtained, the first target segmentation model has a function of performing region segmentation on the first objects in the image more accurately, so that the first target segmentation model can be invoked to perform region segmentation on an image including the first objects, to obtain a region segmentation result corresponding to the image, thereby obtaining a measurement indicator corresponding to the image according to the region segmentation result corresponding to the image.

Exemplarily, after the first target segmentation model is obtained through training, the method further includes: obtaining an image, the image including first objects; invoking a first target segmentation model to perform region segmentation on the image, to obtain a first region segmentation result corresponding to the image, the first region segmentation result being used for indicating a region of the first objects in the image; and obtaining a measurement indicator corresponding to the image based on the first region segmentation result, the measurement indicator being used for indicating a region proportion corresponding to the first objects in the image that meet the region limiting condition, that is, the measurement indicator being used for indicating a proportion of a region of the first objects in the image that meet the region limiting condition in the image. For a specific implementation of such a process, reference may be made to the embodiment shown in FIG. 2.

In the embodiments of this disclosure, a standard region segmentation result is obtained based on a standard region proportion. The standard region segmentation result is more accurate, and a first target segmentation model obtained by training according to the standard region segmentation result has a better region segmentation function. Therefore, the first target segmentation model can be invoked to implement a process of automatically obtaining a measurement indicator corresponding to an image, which can improve the stability and efficiency of image processing, and improve the accuracy of a measurement indicator corresponding to an obtained image.

Figure 13:
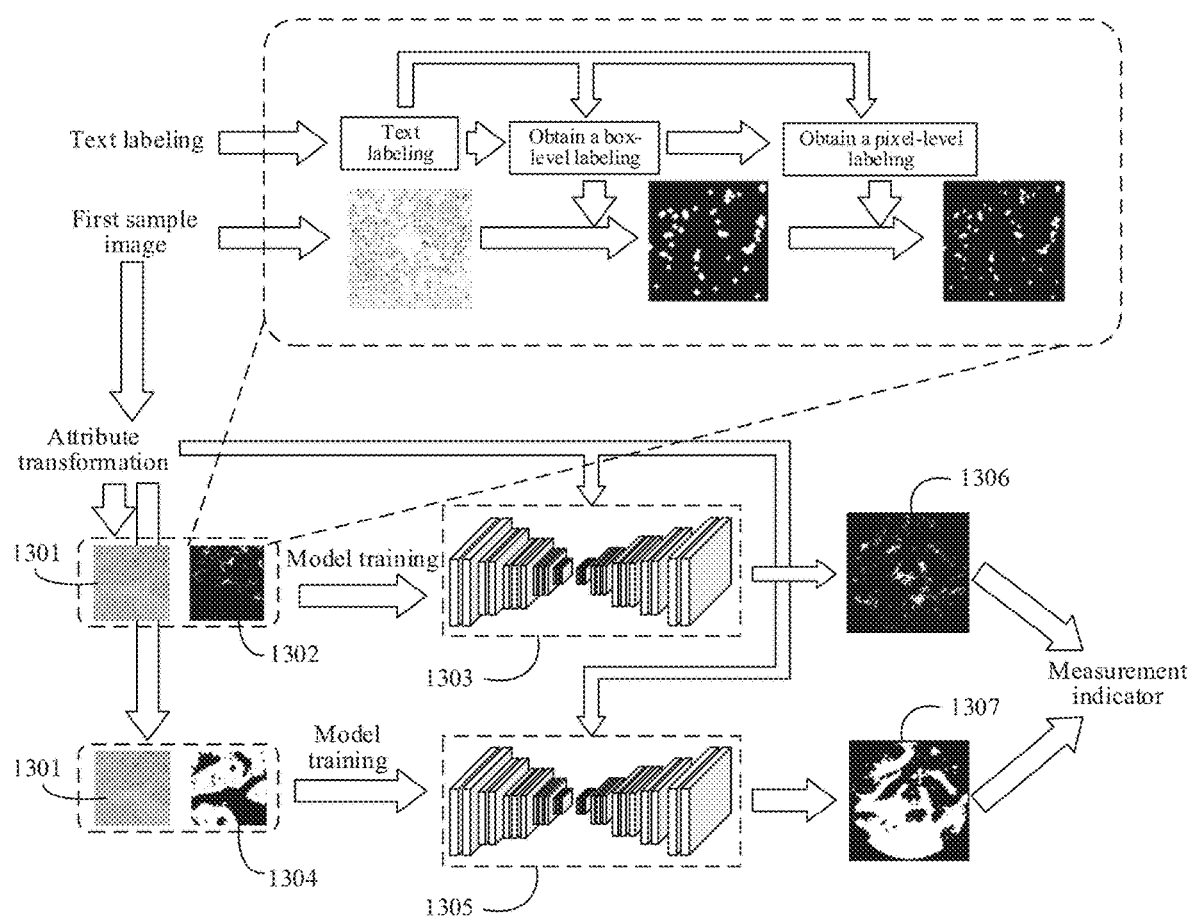
FIG. 13 is a schematic diagram of a process of obtaining a measurement indicator corresponding to an image according to an embodiment of this disclosure.

Exemplarily, a process of obtaining a measurement indicator corresponding to an image is shown in FIG. 13: obtaining a box-level labeling corresponding to the first sample image based on the text labeling corresponding to the first sample image; obtaining a pixel-level labeling corresponding to the first sample image based on the box-level labeling corresponding to the first sample image, where for such a process, reference may be made to the description of FIG. 12; performing attribute transformation on the first sample image, to obtain an attribute-transformed first sample image 1301; training to obtain a first target segmentation model 1303 based on the attribute-transformed first sample image 1301 and a pixel-level labeling 1302 corresponding to the first sample image, the first target segmentation model being configured to perform region segmentation on the image, to obtain a region segmentation result used for indicating a region of the first objects in the image; training to obtain a target region detection model 1305 based on the attribute-transformed first sample image

1301 and a target region labeling 1304 corresponding to the first sample image, the target region detection model being configured to detect a target region (for example, a cancer cell region or a cancer cell stromal region) in the image;

invoking, when the measurement indicator corresponding to the image needs to be obtained, the first target segmentation model 1303 to perform region segmentation on the attribute-transformed image, to obtain a first region segmentation result used for indicating a region of the first objects in the image, the first region segmentation result represented in the form of an image being shown as 1306; invoking the target region detection model 1305 to perform region detection on the attribute-transformed image, to obtain a target region detection result, the target region detection result represented in the form of an image being shown as 1307; and obtaining the measurement indicator corresponding to the image based on the target region detection result and the first region segmentation result.

Figure 14:
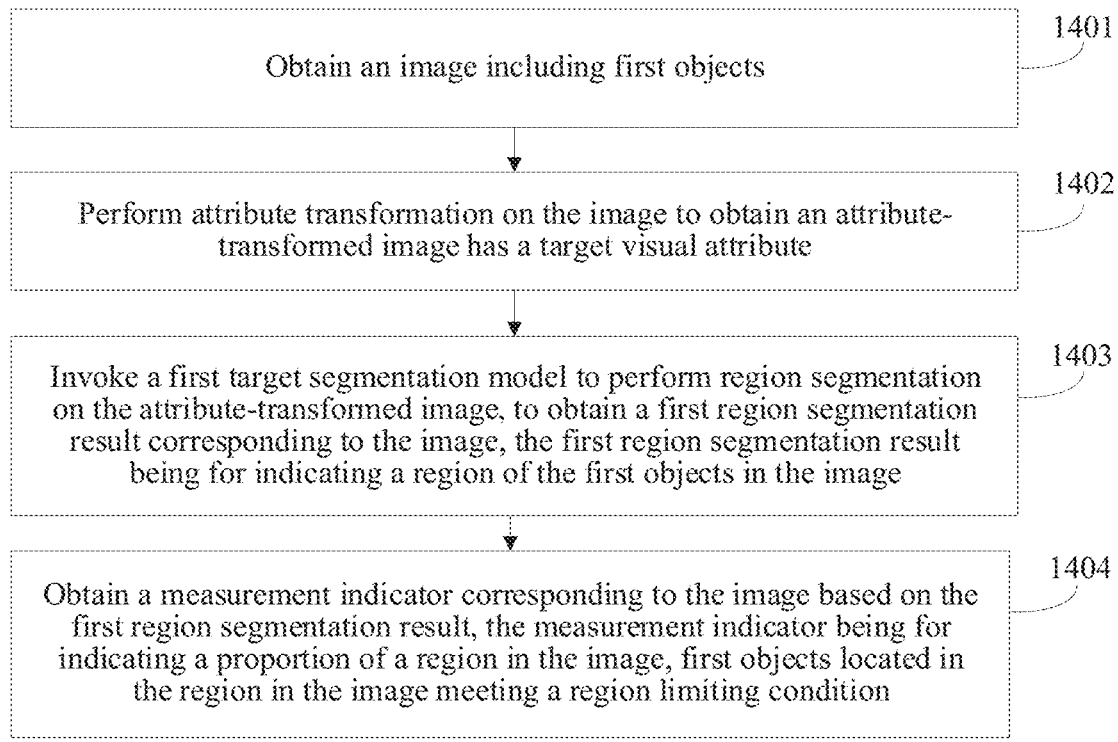
FIG. 14 is a flowchart of an image processing method according to an embodiment of this disclosure.

Based on the implementation environment shown in FIG. 1, an embodiment of this disclosure provides an image processing method. The image processing method is performed by a computer device. The computer device may be the server 12, or may be the terminal 11. This is not limited in the embodiments of this disclosure. As shown in FIG. 14, the image processing method provided in this embodiment of this disclosure includes steps 1401 to 1404.

In step 1401, an image is obtained, the image including first objects.

For an implementation of step 1401, reference may be made to step 201 in the embodiment shown in FIG. 2.

In step 1402, attribute transformation is performed on the image, so that an attribute-transformed image has a target visual attribute.

In an implementation, the image corresponds to at least one color channel, and the process of performing attribute transformation on the image is as follows: determining pixel mean values respectively corresponding to color channels based on pixel values of pixels in the image under the color channels; performing numeric transformation on the pixel mean values corresponding to the color channels by using reference values corresponding to the color channels, to obtain pixel value transformation references respectively corresponding to the color channels, the reference values corresponding to the color channels being determined based on the target visual attribute; and transforming the pixel values of the pixels in the image under the color channels based on the pixel value transformation references respectively corresponding to the color channels.

In another implementation, the process of performing attribute transformation on the image is as follows: obtaining an image transformation model, the image transformation model being configured to output an image having the target visual attribute; and invoking the image transformation model to perform attribute transformation on the image. In this way, the image transformation model is invoked to directly perform attribute transformation on the image, which may improve efficiency of performing attribute transformation on the image.

In step 1403, a first target segmentation model is invoked to perform region segmentation on the attribute-transformed image, to obtain a first region segmentation result corresponding to the image, the first region segmentation result being used for indicating a region of the first objects in the image.

The first target segmentation model is a trained model configured to perform region segmentation on an image having the target visual attribute, to segment a region of the first objects in the image. The type of the first target segmentation model is not limited in this embodiment of this disclosure, as long as the region segmentation result for indicating the region of the first objects in the image can be outputted. Exemplarily, the first target segmentation model is a Link Net model.

The first target segmentation model is obtained by training based on the attribute-transformed first sample image and the standard region segmentation result corresponding to the first sample image. The attribute-transformed first sample image is obtained by performing attribute transformation on the first sample image. The attribute-transformed first sample image has a target visual attribute. Before step 1403 is implemented, it is necessary to obtain the first target segmentation model through training. For a process of obtaining the first target segmentation model through training, reference may be made to an embodiment shown in FIG. 15.

For implementations of steps 1402 and 1403, reference may be made the second manner of step 202 in the embodiment shown in FIG. 2. In the second manner, the first target segmentation model is invoked to perform region segmentation on the image, to obtain the first region segmentation result corresponding to the image.

In step 1404, a measurement indicator corresponding to the image is obtained based on the first region segmentation result, the measurement indicator being used for indicating a proportion of a region in the image, first objects located in the region in the image meeting a region limiting condition.

In an implementation, a process of obtaining a measurement indicator corresponding to the image based on the first region segmentation result is as follows: determining a target region in the image; filtering the region of the first objects in the image by using the target region, to obtain the region of the first objects that meet the region limiting condition in the image; and comparing the region of the first objects that meet the region limiting condition with a total region of the image, to obtain the measurement indicator corresponding to the image.

For an implementation of step 1404, reference may be made to step 203 in the embodiment shown in FIG. 2.

In this embodiment of this disclosure, the process of automatically obtaining a measurement indicator corresponding to an image is implemented by invoking the first target segmentation model. Such an image processing process does not require manual participation, and image processing is more stable and efficient. In addition, before the first target segmentation model is invoked to perform region segmentation, the image is first transformed into an image having a target visual attribute, to reduce interference caused by visual attributes of the image to the first target segmentation model, so that a first region segmentation result segmented by invoking the first target segmentation model is more accurate, thereby improving the accuracy of the obtained measurement indicator.

Figure 15:
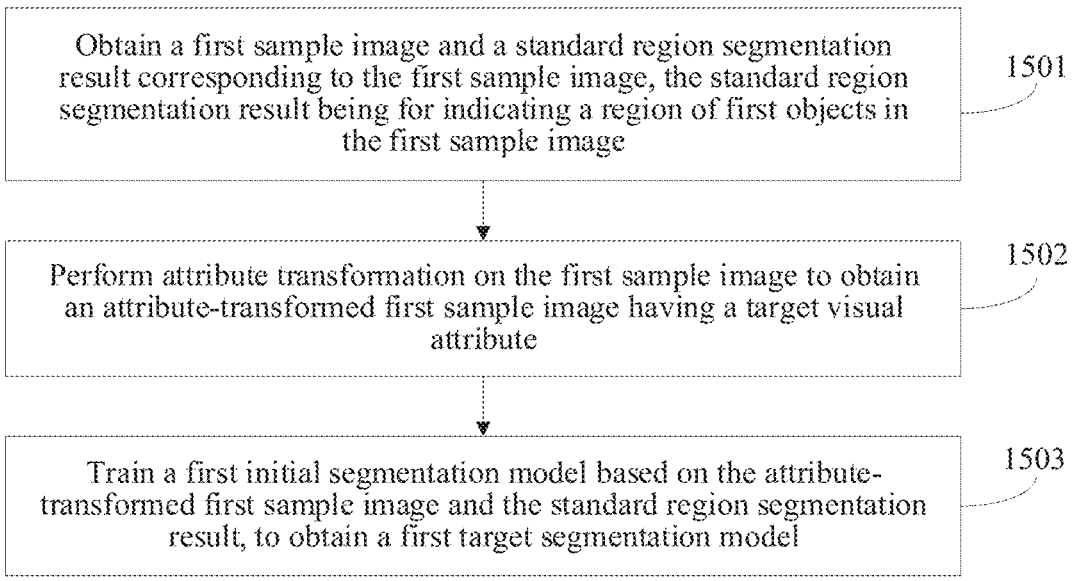
FIG. 15 is a flowchart of a model training method according to an embodiment of this disclosure.

Based on the implementation environment shown in FIG. 1, an embodiment of this disclosure provides a model training method. The model training method may be applied to perform training to obtain the first target segmentation model invoked in the embodiment shown in FIG. 14. The model training method is performed by a computer device. The computer device may be the server 12, or may be the terminal 11. This is not limited in the embodiments of this disclosure. As shown in FIG. 15, the model training method provided in this embodiment of this disclosure includes steps 1501 to 1503.

In step 1501, a first sample image and a standard region segmentation result corresponding to the first sample image are obtained, the standard region segmentation result being used for indicating a region of first objects in the first sample image.

Exemplarily, the first sample image is an image of the same type as the image in the embodiment shown in FIG. 14, to ensure that the first target segmentation model obtained through training can perform region segmentation on the attribute-transformed image more accurately. For a manner of obtaining a first sample image, reference may be made to step 401 in the embodiment shown in FIG. 4. A manner of obtaining a first sample image is described in step 401.

The standard region segmentation result corresponding to the first sample image is used for indicating the region of the first objects in the first sample image. In other words, which region in the first sample image is the region of the first objects can be learned according to the standard region segmentation result. A representation form of the standard region segmentation result is not limited in the embodiments of this disclosure. Exemplarily, the standard region segmentation result is represented as an image, or the standard region segmentation result is represented as a matrix or a vector.

The manner of obtaining a standard region segmentation result corresponding to the first sample image is not limited in the embodiments of this disclosure. In an exemplary embodiment, the manner of obtaining a standard region segmentation result corresponding to the first sample image is as follows: obtaining the standard region segmentation result corresponding to the first sample image according to a region of first sample objects in the first sample image that is manually labeled.

In an exemplary embodiment, a manner of obtaining a standard region segmentation result corresponding to the first sample image is as follows: obtaining a first standard region proportion corresponding to first objects in the first sample image; and obtaining a standard region segmentation result corresponding to the first sample image based on the first standard region proportion.

In an implementation, a manner of obtaining a standard region segmentation result corresponding to the first sample image based on the first standard region proportion is as follows: invoking at least one second target segmentation model to perform region segmentation on the first sample image, to obtain at least one candidate region segmentation result, the at least one second target segmentation model being obtained by training based on a second sample image and a standard region division image corresponding to the second sample image, and the standard region division image corresponding to the second sample image being obtained based on a second standard region proportion corresponding to the first objects in the second sample image; and using a candidate region segmentation result in the at least one candidate region segmentation result that meets a first matching condition with a first standard region proportion as the standard region segmentation result corresponding to the first sample image.

Before the invoking at least one second target segmentation model to perform region segmentation on the first sample image, to obtain at least one candidate region segmentation result, at least one second target segmentation model needs to be obtained through training. In an implementation, the at least one second target segmentation model includes at least one second target segmentation model respectively corresponding to a reference number of second initial segmentation models; and the process of obtaining at least one second target segmentation model through training is as follows: obtaining the standard region division image corresponding to the second sample image based on the second standard region proportion; and separately training the reference number of second initial segmentation models based on the second sample image and the standard region division image, to obtain at least one second target segmentation model corresponding to the reference number of second initial segmentation models and obtained by training for different quantities of rounds.

In an implementation, a manner of obtaining the standard region division image corresponding to the second sample image based on the second standard region proportion includes steps 1-1 to 1-4.

Step 1-1: Obtain a threshold interval corresponding to a reference color channel and a sample channel image corresponding to the second sample image under the reference color channel.

In an implementation, a manner of determining the threshold interval corresponding to the reference color channel is as follows: obtaining a first channel image corresponding to a first reference image under the reference color channel and a second channel image corresponding to a second reference image under the reference color channel, the first reference image excluding the first objects, and the second reference image including the first objects; obtaining a first pixel value distribution of the first channel image; obtaining a second pixel value distribution of the second channel image; and determining the threshold interval corresponding to the reference color channel based on the first pixel value distribution and the second pixel value distribution.

Step 1-2: Perform binarization processing on the sample channel image by using the threshold interval, to obtain a binary image.

Step 1-3: Perform morphology processing on the binary image, to obtain at least one candidate region division image.

In an implementation, after the binary image is obtained, a predicted region proportion corresponding to the first objects in the second sample image is determined based on the binary image.

In an implementation, a manner of performing morphology processing on the binary image, to obtain at least one candidate region division image is as follows: expanding, when the predicted region proportion is less than the second standard region proportion, the binary image by using a reference expansion kernel, to obtain the at least one candidate region division image; and reducing, when the predicted region proportion is greater than the second standard region proportion, the binary image by using a reference reduction kernel, to obtain the at least one candidate region division image.

Step 1-4: Use a candidate region division image in the at least one candidate region division image that meets a second matching condition with the second standard region proportion as the standard region division image corresponding to the second sample image.

For an implementation of obtaining a first standard region proportion corresponding to first objects in the first sample image; and obtaining a standard region segmentation result corresponding to the first sample image based on the first standard region proportion, reference may be made to step 401 and step 402 in the embodiment shown in FIG. 4.

In step 1502, attribute transformation is performed on the first sample image, so that an attribute-transformed first sample image has a target visual attribute.

Attribute transformation is performed on the first sample image, so that an attribute-transformed first sample image has a target visual attribute, thereby reducing interference caused by visual attributes of the first sample image to the process of obtaining the first target segmentation model through training, and improving a training effect of the first target segmentation model. A principle of performing attribute transformation on the first sample image, so that an attribute-transformed first sample image has a target visual attribute is the same as the principle of step 1402 in the embodiment shown in FIG. 14.

In step 1503, a first initial segmentation model is trained based on the attribute-transformed first sample image and the standard region segmentation result, to obtain a first target segmentation model.

After the attribute-transformed first sample image is obtained, a first initial segmentation model is trained based on the attribute-transformed first sample image and the standard region segmentation result. The attribute-transformed first sample image is an image having the target visual attribute. The first initial segmentation model is trained by using sample images having the same visual attribute, so that interference caused by visual attributes of the sample images to the training process, and convergence is achieved more quickly, thereby improving the effect of model training.

Exemplarily, a process of training a first initial segmentation model based on the attribute-transformed first sample image and the standard region segmentation result, to obtain a first target segmentation model is as follows: invoking the first initial segmentation model to perform region segmentation on the attribute-transformed first sample image, to obtain a predicted region segmentation result; obtaining a loss function based on the predicted region segmentation result and the standard region segmentation result; and training the first initial segmentation model by using the loss function, to obtain the first target segmentation model. The training process is a supervisory training process, and the standard region segmentation result is used for providing supervisory signals for the supervisory training process.

After a trained first target segmentation model is obtained, the first target segmentation model has a function of accurately segmenting the region of the first objects in an image having a target visual attribute, so that the first target segmentation model can be invoked to perform region segmentation on an image having the target visual attribute and including the first objects, to obtain a region segmentation result corresponding to the image, thereby obtaining a measurement indicator corresponding to the image according to the region segmentation result corresponding to the image.

Exemplarily, after the first target segmentation model is obtained through training, the method further includes: obtaining an image, the image including first objects; performing attribute transformation on the image, so that an attribute-transformed image has a target visual attribute; invoking a first target segmentation model to perform region segmentation on the attribute-transformed image, to obtain a first region segmentation result corresponding to the image, the first region segmentation result being used for indicating a region of the first objects in the image; and obtaining a measurement indicator corresponding to the image based on the first region segmentation result, the measurement indicator being used for indicating a proportion of a region in the image, first objects located in the region in the image meeting a region limiting condition. For a specific implementation of such a process, reference may be made to the embodiment shown in FIG. 14.

In the embodiments of this disclosure, the first target segmentation model is obtained by training based on the attribute-transformed first sample image and the standard region segmentation result, and the attribute-transformed first sample image has the target visual attribute, so that interference caused by visual attributes of the first sample image to the first target segmentation model obtained through training may be reduced, and a first target segmentation model obtained through has a better region segmentation function. Therefore, the first target segmentation model can be invoked to implement a process of automatically obtaining a measurement indicator corresponding to an image, which can improve the stability and efficiency of image processing, and improve the accuracy of a measurement indicator corresponding to an obtained image.

The following describes an exemplary application of this embodiment of this disclosure in an actual application scenario.

In an exemplary embodiment, the image processing method provided in this embodiment of this disclosure is applicable to an application scenario of determining an IC value (an immune cell proportion value) corresponding to a tumor image. In such an application scenario, the image is a tumor image, the tumor image is obtained by performing image acquisition on a field of view of a tumor region in a pathology slide, and the pathology slide is obtained by staining based on a PD-L1 method. The actual physical significance of a total region of the tumor image is the total region, and the IC value corresponding to the tumor image is a proportion of stained IC cells in the tumor image in the total region. The IC value corresponding to the tumor image can be considered as expression of the PD-L1 method.

Immunohistochemistry to assess the efficacy of immunotherapy for PD-1/PD-L has now become the focus and hotspot of the study. PD-L1 is related to tumor progression and poor prognosis, and PD-L1 is considered as a valid biomarker for predicting prognosis. For example, breast cancer is the most common malignancy in women, and precision medicine provides opportunities for more refined and personalized treatment of breast cancer. Humanized monoclonal antibodies (atezolizumab) in combination with paclitaxel protein binding agents can be used for the concomitant diagnosis of unresectable locally advanced triple-negative breast cancer (TNBC) or metastatic TNBC, PD-L1 (SP142). In the treatment of breast cancer, immune cells in the tumor region can be stained by using the PD-L1 method, and a proportion of immune cells in the tumor region (PD-L1 expression) can be obtained to assist the physician in assessing the patient's ability to resist cancer, that is, the physician may estimate the proportion of stained immune cells (IC) in the tumor region to further select a method of cancer treatment.

Figure 16:
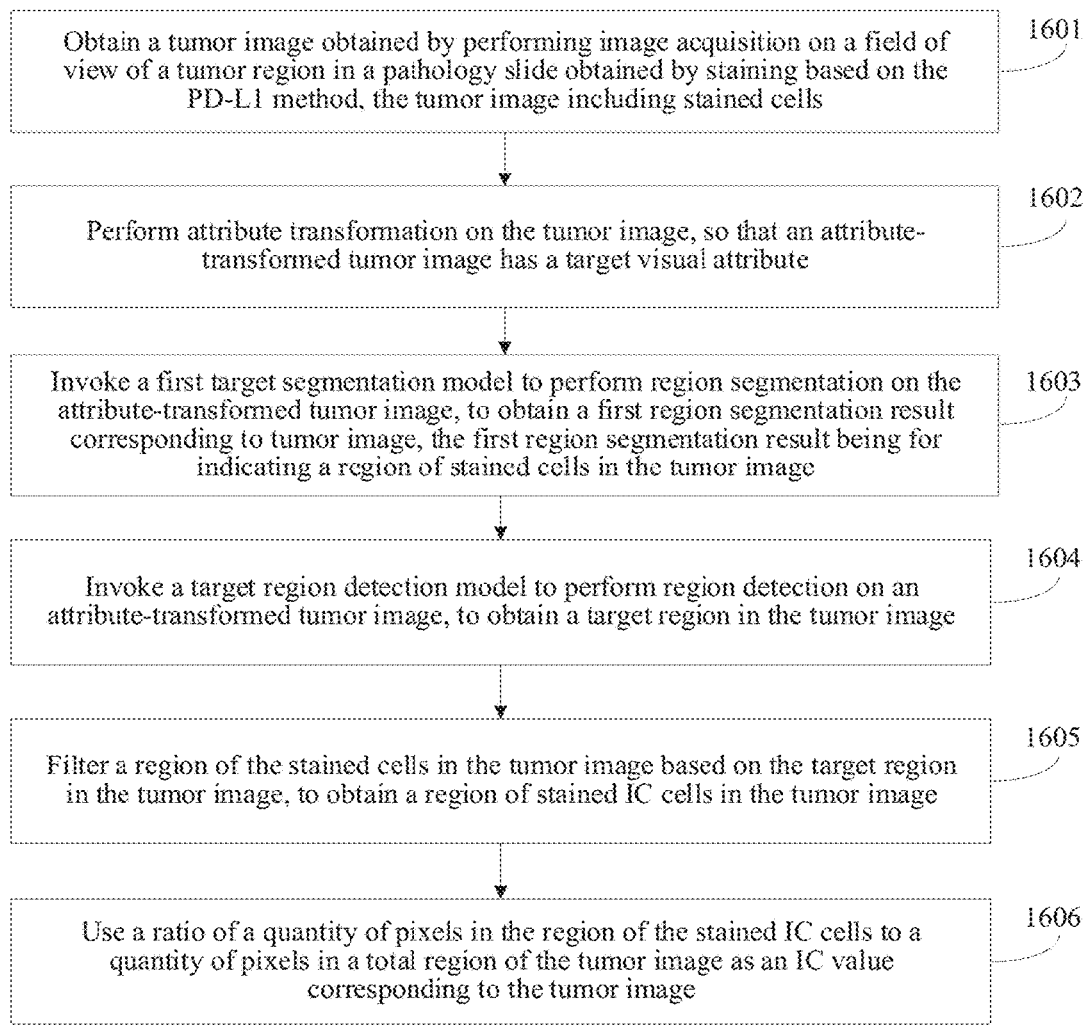
FIG. 16 is a flowchart of determining an IC value corresponding to a tumor image according to an embodiment of this disclosure.

In such an application scenario, the first objects are stained cells, first objects meeting the region limiting condition are stained IC cells (stained immune cells), and the measurement indicator is an IC value corresponding to the tumor image. The stained IC cells are stained cells not located in the cancer cell region. As shown in FIG. 16, based on the image processing method provided in this embodiment of this disclosure, a process of determining an IC value corresponding to a tumor image includes steps 1601 to 1606.

In step 1601, a tumor image obtained by performing image acquisition on a field of view of a tumor region in a pathology slide obtained by staining based on the PD-L1 method is obtained, the tumor image including stained cells.

In step 1602, attribute transformation is performed on the tumor image, so that an attribute-transformed tumor image has a target visual attribute.

In step 1603, a first target segmentation model is invoked to perform region segmentation on the attribute-transformed tumor image, to obtain a first region segmentation result corresponding to tumor image, the first region segmentation result being used for indicating a region of stained cells in the tumor image.

The first target segmentation model is obtained through training based on an attribute-transformed first sample tumor image and a standard region segmentation result corresponding to the first sample tumor image, the standard region segmentation result being obtained based on a first standard region proportion corresponding to stained cells in the first sample tumor image, and the first standard region proportion corresponding to the stained cells in the first sample tumor image being used for a proportion of a region where the stained cells in the first sample tumor image is located in the first sample tumor image.

In step 1604, a target region detection model is invoked to perform region detection on an attribute-transformed tumor image, to obtain a target region in the tumor image.

The target region is a cancer cell region or a cancer cell stromal region. The cancer cell region or the cancer cell stromal region is a mutually exclusive region. In the total region of the tumor image, a region other than the cancer cell region is the cancer cell stromal region.

Exemplarily, using an example in which the target region is a cancer cell region, the target region detection model is a Link Net model. Since the cancer cell region is relatively large, the cancer cell regions is manually labeled in the process of obtaining a target region detection model through training. However, since the stained cells are smaller-sized and have a large quantity, it is difficult to manually label the region of the stained cells. Based on this, a standard region segmentation result in the process of obtaining a first target segmentation model through training is obtained according to text labeling (that is, a standard region proportion corresponding to the stained cells) manually labeled.

In step 1605, a region of the stained cells in the tumor image is filtered based on the target region in the tumor image, to obtain a region of stained IC cells in the tumor image.

When the target region is a cancer cell region, the region of the stained cells in the tumor image is filtered by using the cancer cell region, and a region of stained cells retained outside the cancer cell region is used as the region of the stained IC cells in the tumor image. When the target region is a cancer cell stromal region, the region of the stained cells in the tumor image is filtered by using the cancer cell stromal region, and a region of stained cells retained inside the cancer cell region is used as the region of the stained IC cells in the tumor image.

Since stained cells in the cancer cell region cannot be regarded as stained IC cells, a region of invalid stained cells is filtered by using the cancer cell region or the cancer cell stromal region, to finally obtain the region of the stained IC cells in the tumor image.

In step 1606, a ratio of a quantity of pixels in the region of the stained IC cells to a quantity of pixels in a total region of the tumor image is used as an IC value corresponding to the tumor image.

Exemplarily, a formula for calculating the IC value is as follows:

$$IC\ value = \frac{a\ quantity\ of\ pixels\ in\ a\ region\ of\ stained\ IC\ cells}{a\ quantity\ of\ pixels\ in\ a\ total\ region\ of\ a\ tumor\ image}$$

Exemplarily, a quantity of pixels located within the total region of the tumor image is a quantity of all pixels in the tumor image. The total region of the tumor image is considered as the total region, and an IC value calculated in such a manner can represent a ratio of stained IC cells in the tumor region.

Figure 17:
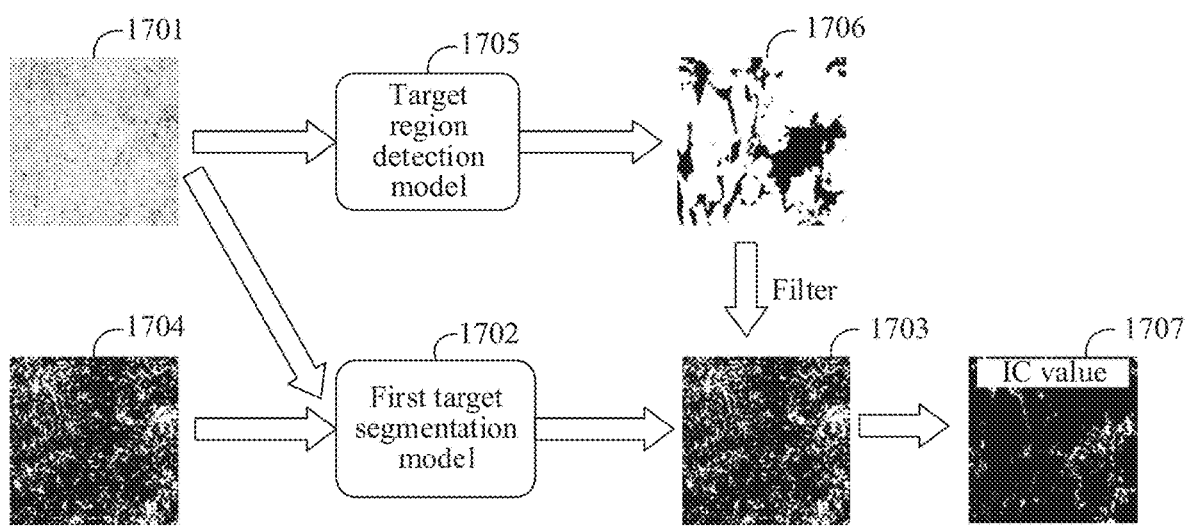
FIG. 17 is a schematic diagram of a process of determining an IC value corresponding to a tumor image according to an embodiment of this disclosure.

Exemplarily, a process of determining an IC value corresponding to the tumor image is shown in FIG. 17. Attribute transformation is performed on the tumor image to obtain an attribute-transformed tumor image 1701. The first target segmentation model 1702 is invoked to perform region segmentation on the attribute-transformed tumor image 1701, to obtain a first region segmentation result 1703 represented in the form of an image. In the first region segmentation result 1703, a region of stained cells is represented in white, and other regions are represented in white. The first target segmentation model 1702 is obtained through training based on a sample tumor image and a standard region segmentation result 1704 corresponding to the sample tumor image. A target region detection model 1705 is invoked to perform region detection on the attribute-transformed tumor image 1701, to obtain a target region detection result 1706 represented in the form of an image. In the target region detection result 1706, the cancer cell region is represented in white, and the cancer cell stromal region is represented in black.

The region of the stained cells (which may be considered as stained cancer cells) in the cancer cell region indicated by the first region segmentation result 1703 is removed according to the target region detection result 1706, to obtain an image 1707 used for indicating a region of stained IC cells. In the image 1707, the region of the stained IC cells is represented in white, and other regions are represented as black. A ratio of a quantity of pixels in the region of the stained IC cells in the image 1707 to a quantity of all pixels in the image 1707 is used as an IC value corresponding to the tumor image. Exemplarily, the IC value corresponding to the tumor image is labeled on the image 1707, and the image 1707 labeled with the IC value is presented to the physician for viewing.

Exemplarily, the method provided in the embodiments of this disclosure is applicable to tumor images acquired by a plurality of image acquisition devices. In other words, IC values corresponding to the tumor images acquired by the plurality of image acquisition devices can be obtained more accurately. Predicted performance of the image processing method provided in the embodiments of this disclosure on two different image acquisition devices was tested. Exemplarily, the two different image acquisition devices are respectively a domestic Unic scanner (Unic digital scanner precision 600 Series, Unic Technologies, Inc.) and a Japanese Hamamatsu scanner (NanoZoomer S210 Digital slide scanner C13239-01, Hamamatsu Photonics K.K.) The domestic Unic scanner is commonly used in domestic hospitals, and the Japanese Hamamatsu scanner is highly used internationally and is often used in international hospitals and specialized institutions. Compared with the domestic Unic scanner, the images acquired by the Japanese Hamamatsu scanner are high in sharpness, focused, rich in color, and relatively darker. During the test, the region of the stained cells segmented by the first target segmentation model and the cancer cell region detected by the target region detection model are labeled with different colors on an attribute-transformed image for ease of comparison and viewing, and the test results are shown in FIG. 18.

Figure 18:
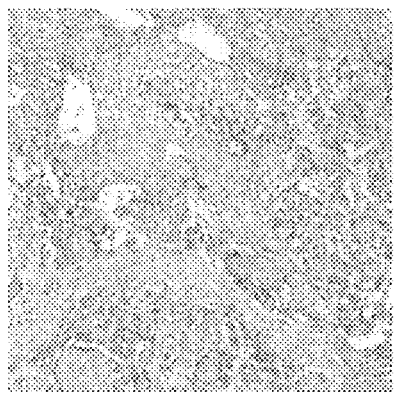
FIG. 18 is a schematic diagram of test results of predicted performance of an image processing method performed by two different image acquisition devices according to an embodiment of this disclosure.
Figure 18:
Figure 18:
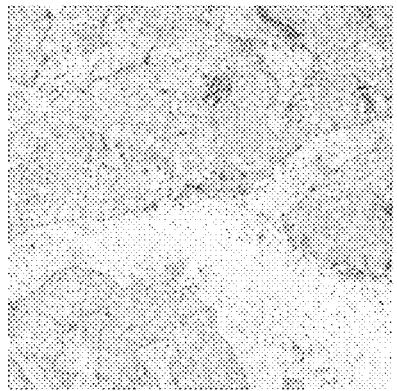
Figure 18:
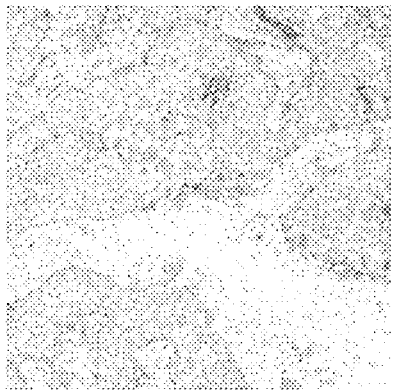
Figure 18:
Figure 18:
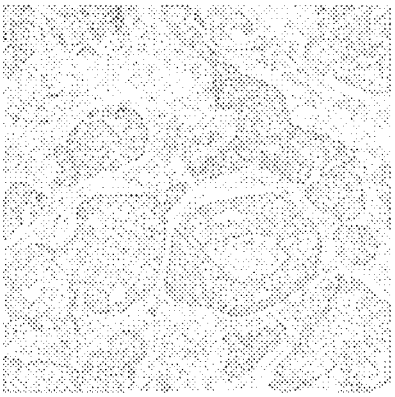

In FIG. 18, (1), (3), and (5) of FIG. 18 are test results obtained by testing the tumor images acquired by the domestic Unic scanner, and (2), (4), and (6) in FIG. 18 are test results obtained by testing the tumor images acquired by the Japanese Hamamatsu scanner. In each test result, the region of the stained cells segmented by the first target segmentation model and the cancer cell region detected by the target region detection model are labeled with different colors on an attribute-transformed tumor image. (1) and (2) of FIG. 18 are test results obtained by testing the tumor images acquired for the same tumor field of view by the domestic Unic scanner and the Japanese Hamamatsu scanner, and a standard IC value corresponding to (1) and (2) of FIG. 18 is 5%; (3) and (4) of FIG. 18 are test results obtained by testing the tumor images acquired for the same tumor field of view by the domestic Unic scanner and the Japanese Hamamatsu scanner, and a standard IC value corresponding to (3) and (4) of FIG. 18 is 2%; and (5) and (6) of FIG. 18 are test results obtained by testing the tumor images obtained acquired for the same tumor field of view by the domestic Unic scanner and the Japanese Hamamatsu scanner, and a standard IC value corresponding to (5) and (6) of FIG. 18 is 0%.

An IC value determined based on the test result shown in (1) of FIG. 18 is 6.0%, and an IC value determined based on the test result shown in (2) of FIG. 18 is 6.1%; An IC value determined based on the test result shown in (3) of FIG. 18 is 2.1%, and an IC value determined based on the test result shown in (4) of FIG. 18 is 2.7%; and The IC value was determined to be 0.1% based on the test results shown in (5) of FIG. 18 and 0.3% based on the test results shown in (6) of FIG. 18. Based on the test results, a mean error of IC value prediction for tumor images acquired by two different scanners was 0.5%, and an intraclass correlation coefficient of prediction result consistency was 0.98. This explains that, the image processing method provided in the embodiments of this disclosure is applicable to a plurality of image acquisition devices. This is mainly because an overall visual feeling is relatively close after attribute transformation is performed on the image, and adverse impacts of visual attributes of the image acquisition device on the model can be reduced.

Figure 19:
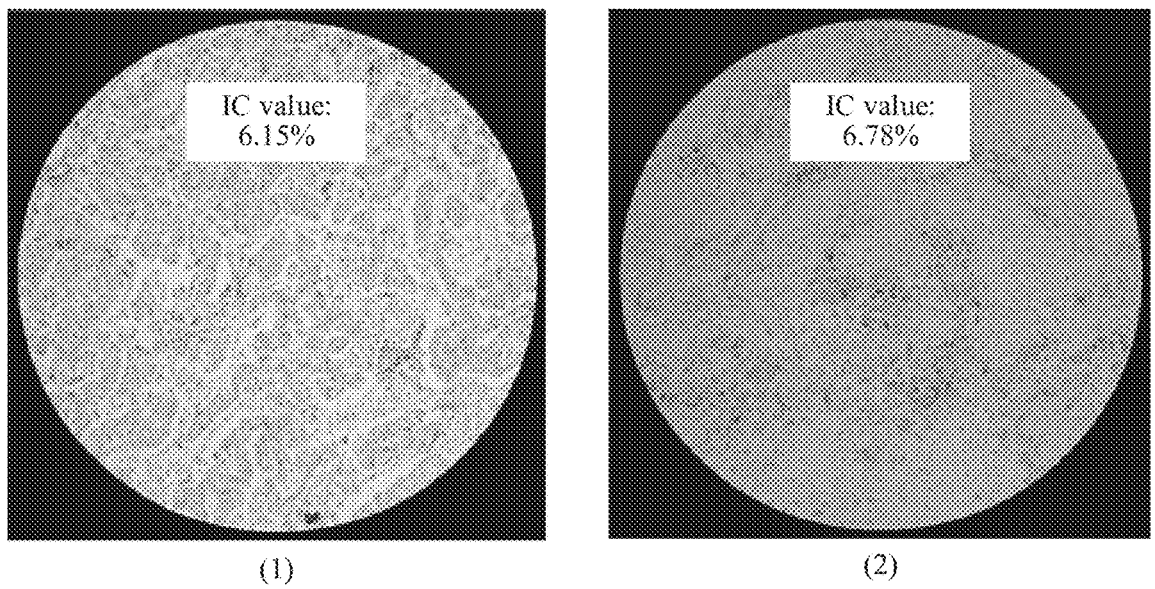
FIG. 19 is a schematic diagram of test results of testing an IC value of a tumor image acquired by a microscope according to an embodiment of this disclosure.

Based on the image processing method provided in the embodiments of this disclosure, an IC value test is performed on the tumor image acquired by the microscope, the test result including an IC value and a regional display result. As shown in FIG. 19, (1) of FIG. 19 is the test result obtained by treating the tumor image after the attribute transformation is performed, the IC value was 6.15%, and (2) of FIG. 19 is the test result obtained by directly processing the microscopically acquired tumor image, the IC value was 6.78%. The test results are visually pleasing and approved by the cooperating physician. The color segmentation in a region display result of test results obtained by processing the attribute-transformed tumor image is more distinct. Exemplarily, in the region display results, the region of the stained cells and the cancer cell region are labeled with different colors for ease of distinguishing.

Based on the image processing method provided in the embodiments of this disclosure, a common interpretation method under a variety of image acquisition devices (e.g., different WSI scanners, microscopes, etc.) can be implemented for the interpretation of IC values of breast pathology PD-L1. An interpretation error of the same field of view in different WSI scanners was within 0.5%, and consistency of the interpretation results ICC=0.98 indicates high robustness of the IC value interpretation method. An important factor in this high versatility interpretation method is the transformation of the text labeling into the pixel-level labeling, and attribute transformation is performed on image, so that a segmentation model with high segmentation accuracy can be trained.

Figure 20:
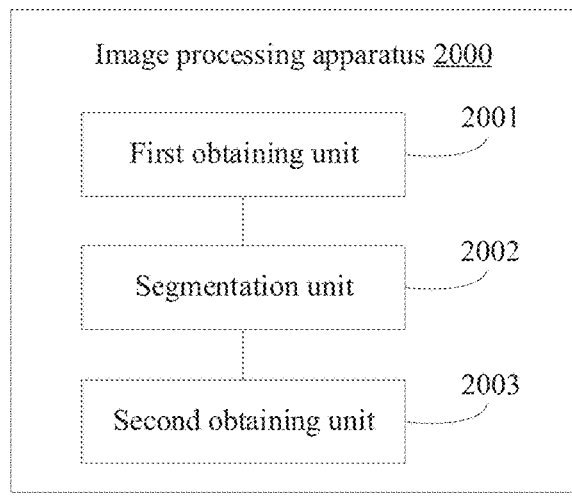
FIG. 20 is a schematic diagram of an image processing apparatus according to an embodiment of this disclosure.

Referring to FIG. 20, an embodiment of this disclosure provides an image processing apparatus 2000, including:

a first obtaining unit 2001, configured to obtain an image, the image including first objects;

a segmentation unit 2002, configured to invoke a first target segmentation model to perform region segmentation on the image, to obtain a first region segmentation result corresponding to the image, the first region segmentation result being used for indicating a region of the first objects in the image, the first target segmentation model being obtained by training based on a first sample image and a standard region segmentation result corresponding to the first sample image, and the standard region segmentation result being obtained based on a first standard region proportion corresponding to the first objects in the first sample image; and a second obtaining unit 2003, configured to obtain a measurement indicator corresponding to the image based on the first region segmentation result, the measurement indicator being used for indicating a proportion of a region in the image, first objects located in the region in the image meeting a region limiting condition.

In an implementation, the second obtaining unit 2003 is configured to: determine a target region in the image; filter the region of the first objects in the image by using the target region, to obtain the region of the first objects that meet the region limiting condition in the image; and compare the region of the first objects that meet the region limiting condition with a total region of the image, to obtain the measurement indicator corresponding to the image.

In an implementation, the segmentation unit 2002 is configured to: perform attribute transformation on the image, so that an attribute-transformed image has a target visual attribute; and invoke the first target segmentation model to perform region segmentation on the attribute-transformed image, to obtain the first region segmentation result corresponding to the image.

In an implementation, the image corresponds to at least one color channel, and the segmentation unit 2002 is further configured to: determine pixel mean values respectively corresponding to color channels based on pixel values of pixels in the image under the color channels; perform numeric transformation on the pixel mean values corresponding to the color channels by using reference values corresponding to the color channels, to obtain pixel value transformation references respectively corresponding to the color channels, the reference values corresponding to the color channels being determined based on the target visual attribute; and transform the pixel values of the pixels in the image under the color channels based on the pixel value transformation references respectively corresponding to the color channels.

In an implementation, the segmentation unit 2002 is further configured to: obtain an image transformation model, the image transformation model being configured to output an image having the target visual attribute; and invoke the image transformation model to perform attribute transformation on the image.

In this embodiment of this disclosure, the process of automatically obtaining a measurement indicator corresponding to an image is implemented by invoking the first target segmentation model. Such an image processing process does not require manual participation, and image processing is more stable and efficient. In addition, a standard region segmentation result on which obtaining a first target segmentation model through training is based is obtained based on a standard region proportion corresponding to the first objects, which is more accurate. In this way, the first target segmentation model having a better region segmentation function can be obtained through training, and the measurement indicator obtained according to the first region segmentation result segmented by the first target segmentation model is more accurate.

Figure 21:
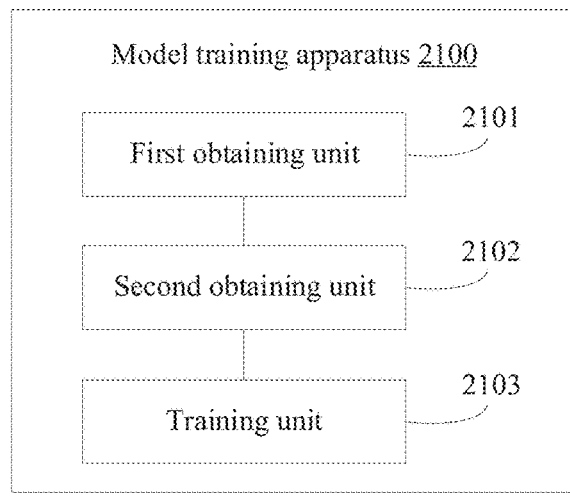
FIG. 21 is a schematic diagram of a model training apparatus according to an embodiment of this disclosure.

Referring to FIG. 21, an embodiment of this disclosure provides a model training apparatus 2100, including:

a first obtaining unit 2101, configured to obtain a first sample image and a first standard region proportion corresponding to first objects in the first sample image;

a second obtaining unit 2102, configured to obtain a standard region segmentation result corresponding to the first sample image based on the first standard region proportion, the standard region segmentation result being used for indicating a region of the first objects in the first sample image; and a training unit 2103, configured to train a first initial segmentation model based on the first sample image and the standard region segmentation result, to obtain a first target segmentation model.

In an implementation, the second obtaining unit 2102 is configured to: invoke at least one second target segmentation model to perform region segmentation on the first sample image, to obtain at least one candidate region segmentation result, the at least one second target segmentation model being obtained by training based on a second sample image and a standard region division image corresponding to the second sample image, and the standard region division image corresponding to the second sample image being obtained based on a second standard region proportion corresponding to the first objects in the second sample image; and use a candidate region segmentation result in the at least one candidate region segmentation result that meets a first matching condition with a first standard region proportion as the standard region segmentation result corresponding to the first sample image.

Figure 22:
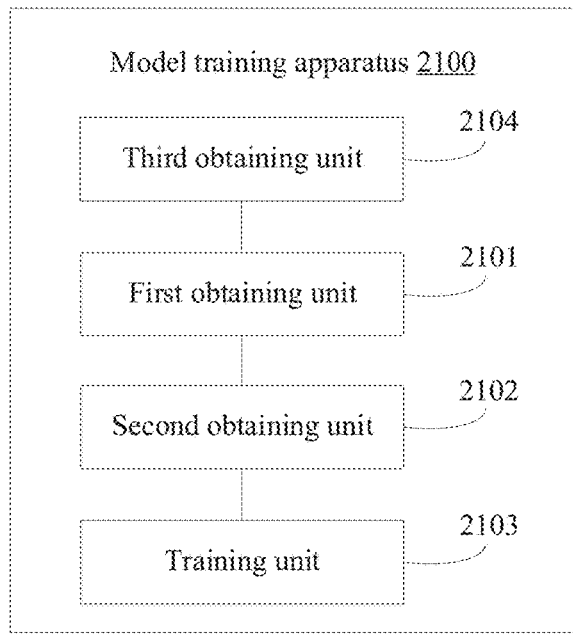
FIG. 22 is a schematic diagram of a model training apparatus according to an embodiment of this disclosure.

In an implementation, the at least one second target segmentation model includes at least one second target segmentation model respectively corresponding to a reference number of second initial segmentation models; and Referring to FIG. 22, the apparatus 2100 further includes:

a third obtaining unit 2104, configured to obtain the standard region division image corresponding to the second sample image based on the second standard region proportion; and the training unit 2103, further configured to separately train the reference number of second initial segmentation models based on the second sample image and the standard region division image, to obtain at least one second target segmentation model corresponding to the reference number of second initial segmentation models and obtained by training for different quantities of rounds.

In an implementation, the third obtaining unit 2104 is configured to: obtain a threshold interval corresponding to a reference color channel and a sample channel image corresponding to the second sample image under the reference color channel; perform binarization processing on the sample channel image by using the threshold interval, to obtain a binary image; perform morphology processing on the binary image, to obtain at least one candidate region division image; and use a candidate region division image in the at least one candidate region division image that meets a second matching condition with the second standard region proportion as the standard region division image corresponding to the second sample image.

In an implementation, the third obtaining unit 2104 is further configured to: obtain a first channel image corresponding to a first reference image under the reference color channel and a second channel image corresponding to a second reference image under the reference color channel, the first reference image excluding the first objects, and the second reference image including the first objects; obtain a first pixel value distribution of the first channel image; obtain a second pixel value distribution of the second channel image; and determine the threshold interval corresponding to the reference color channel based on the first pixel value distribution and the second pixel value distribution.

In an implementation, the third obtaining unit 2104 is further configured to determine, based on the binary image, a predicted region proportion corresponding to the first objects in the second sample image; and expand, when the predicted region proportion is less than the second standard region proportion, the binary image by using a reference expansion kernel, to obtain the at least one candidate region division image.

In an implementation, the third obtaining unit 2104 is further configured to determine, based on the binary image, a predicted region proportion corresponding to the first objects in the second sample image; and reduce, when the predicted region proportion is greater than the second standard region proportion, the binary image by using a reference reduction kernel, to obtain the at least one candidate region division image.

In an implementation, the training unit 2103 is configured to: perform attribute transformation on the first sample image, so that an attribute-transformed first sample image has a target visual attribute; and train a first initial segmentation model based on the attribute-transformed first sample image and the standard region segmentation result, to obtain a first target segmentation model.

In the embodiments of this disclosure, a standard region segmentation result is obtained based on a standard region proportion. The standard region segmentation result is more accurate, and a first target segmentation model obtained by training according to the standard region segmentation result has a better region segmentation function. Therefore, the first target segmentation model can be invoked to implement a process of automatically obtaining a measurement indicator corresponding to an image, which can improve the stability and efficiency of image processing, and improve the accuracy of a measurement indicator corresponding to an obtained image.

Figure 23:
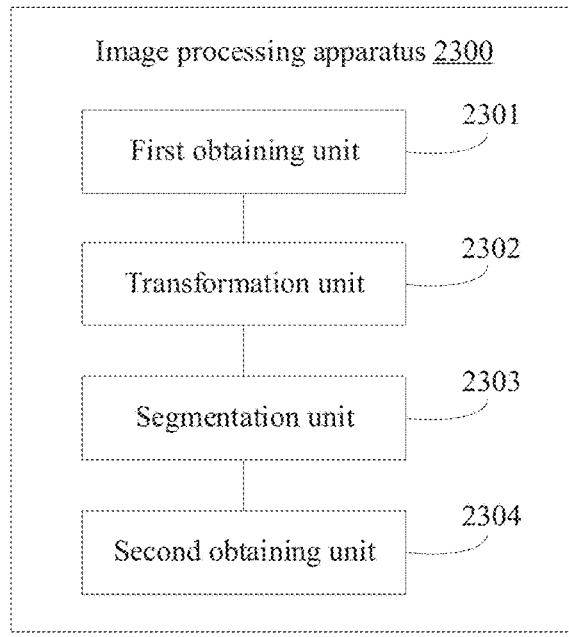
FIG. 23 is a schematic diagram of an image processing apparatus according to an embodiment of this disclosure.

Referring to FIG. 23, an embodiment of this disclosure provides an image processing apparatus 2300, including:

a first obtaining unit 2301, configured to obtain an image, the image including first objects;

a transformation unit 2302, configured to perform attribute transformation on the image, so that an attribute-transformed image has a target visual attribute;

a segmentation unit 2303, configured to invoke a first target segmentation model to perform region segmentation on the attribute-transformed image, to obtain a first region segmentation result corresponding to the image, the first region segmentation result being used for indicating a region of the first objects in the image; and a second obtaining unit 2304, configured to obtain a measurement indicator corresponding to the image based on the first region segmentation result, the measurement indicator being used for indicating a proportion of a region in the image, first objects located in the region in the image meeting a region limiting condition.

In an implementation, the image corresponds to at least one color channel, and the transformation unit 2302 is configured to: determine pixel mean values respectively corresponding to color channels based on pixel values of pixels in the image under the color channels; perform numeric transformation on the pixel mean values corresponding to the color channels by using reference values corresponding to the color channels, to obtain pixel value transformation references respectively corresponding to the color channels, the reference values corresponding to the color channels being determined based on the target visual attribute; and transform the pixel values of the pixels in the image under the color channels based on the pixel value transformation references respectively corresponding to the color channels.

In an implementation, the transformation unit 2302 is configured to: obtain an image transformation model, the image transformation model being configured to output an image having the target visual attribute; and invoke the image transformation model to perform attribute transformation on the image.

In an implementation, the second obtaining unit 2304 is configured to: determine a target region in the image; filter the region of the first objects in the image by using the target region, to obtain the region of the first objects that meet the region limiting condition in the image; and compare the region of the first objects that meet the region limiting condition with a total region of the image, to obtain the measurement indicator corresponding to the image.

In this embodiment of this disclosure, the process of automatically obtaining a measurement indicator corresponding to an image is implemented by invoking the first target segmentation model. Such an image processing process does not require manual participation, and image processing is more stable and efficient. In addition, before the first target segmentation model is invoked to perform region segmentation, the image is first transformed into an image having a target visual attribute, to reduce interference caused by visual attributes of the image to the first target segmentation model, so that a first region segmentation result segmented by invoking the first target segmentation model is more accurate, thereby improving the accuracy of the obtained measurement indicator.

Figure 24:
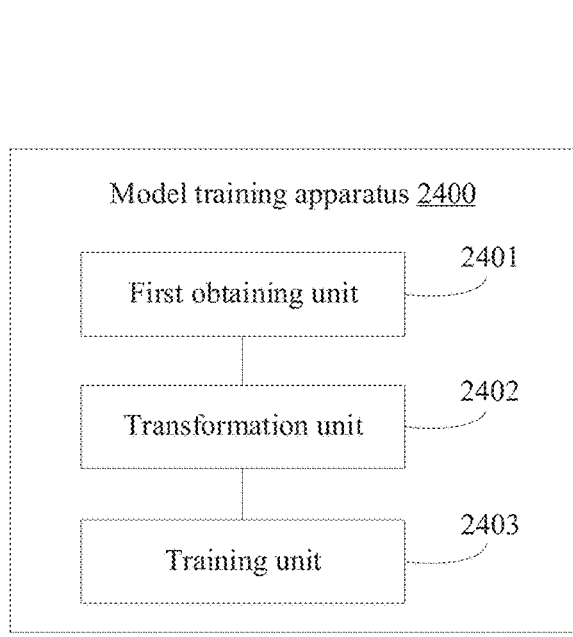
FIG. 24 is a schematic diagram of a model training apparatus according to an embodiment of this disclosure.

Referring to FIG. 24, an embodiment of this disclosure provides a model training apparatus 2400, including:

a first obtaining unit 2401, configured to obtain a first sample image and a standard region segmentation result corresponding to the first sample image, the standard region segmentation result being used for indicating a region of first objects in the first sample image;

a transformation unit 2402, configured to perform attribute transformation on the first sample image, so that an attribute-transformed first sample image has a target visual attribute; and a training unit 2403, configured to train a first initial segmentation model based on the attribute-transformed first sample image and the standard region segmentation result, to obtain a first target segmentation model.

In an implementation, the first obtaining unit 2401 is configured to: obtain a first standard region proportion corresponding to first objects in the first sample image; and obtain a standard region segmentation result corresponding to the first sample image based on the first standard region proportion.

In an implementation, the first obtaining unit 2401 is further configured to: invoke at least one second target segmentation model to perform region segmentation on the first sample image, to obtain at least one candidate region segmentation result, the at least one second target segmentation model being obtained by training based on a second sample image and a standard region division image corresponding to the second sample image, and the standard region division image corresponding to the second sample image being obtained based on a second standard region proportion corresponding to the first objects in the second sample image; and use a candidate region segmentation result in the at least one candidate region segmentation result that meets a first matching condition with a first standard region proportion as the standard region segmentation result corresponding to the first sample image.

Figure 25:
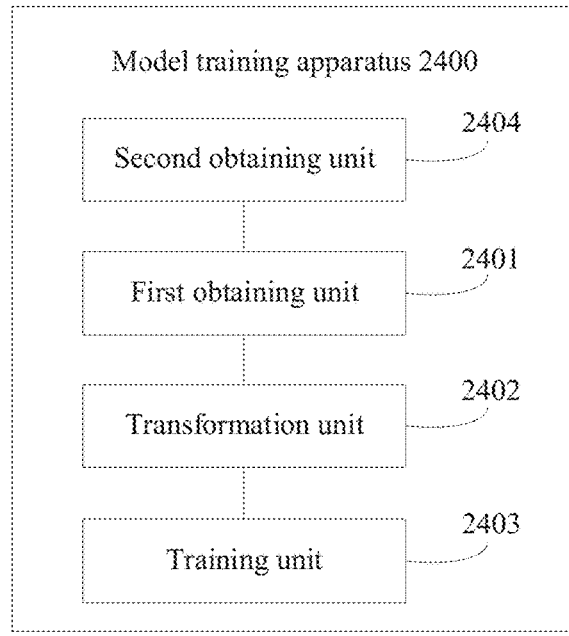
FIG. 25 is a schematic diagram of a model training apparatus according to an embodiment of this disclosure.

In an implementation, the at least one second target segmentation model includes at least one second target segmentation model respectively corresponding to a reference number of second initial segmentation models; and Referring to FIG. 25, the apparatus 2400 further includes:

a second obtaining unit 2404, configured to obtain the standard region division image corresponding to the second sample image based on the second standard region proportion; and the training unit 2403, further configured to separately train the reference number of second initial segmentation models based on the second sample image and the standard region division image, to obtain at least one second target segmentation model corresponding to the reference number of second initial segmentation models and obtained by training for different quantities of rounds.

In an implementation, the second obtaining unit 2404 is configured to: obtain a threshold interval corresponding to a reference color channel and a sample channel image corresponding to the second sample image under the reference color channel; perform binarization processing on the sample channel image by using the threshold interval, to obtain a binary image; perform morphology processing on the binary image, to obtain at least one candidate region division image; and use a candidate region division image in the at least one candidate region division image that meets a second matching condition with the second standard region proportion as the standard region division image corresponding to the second sample image.

In an implementation, the second obtaining unit 2404 is further configured to. obtain a first channel image corresponding to a first reference image under the reference color channel and a second channel image corresponding to a second reference image under the reference color channel, the first reference image excluding the first objects, and the second reference image including the first objects; obtain a first pixel value distribution of the first channel image; obtain a second pixel value distribution of the second channel image; and determine the threshold interval corresponding to the reference color channel based on the first pixel value distribution and the second pixel value distribution.

In an implementation, the second obtaining unit 2404 is further configured to determine, based on the binary image, a predicted region proportion corresponding to the first objects in the second sample image; and expand, when the predicted region proportion is less than the second standard region proportion, the binary image by using a reference expansion kernel, to obtain the at least one candidate region division image.

In an implementation, the second obtaining unit 2404 is further configured to determine, based on the binary image, a predicted region proportion corresponding to the first objects in the second sample image; and reduce, when the predicted region proportion is greater than the second standard region proportion, the binary image by using a reference reduction kernel, to obtain the at least one candidate region division image.

In the embodiments of this disclosure, the first target segmentation model is obtained by training based on the attribute-transformed first sample image and the standard region segmentation result, and the attribute-transformed first sample image has the target visual attribute, so that interference caused by visual attributes of the first sample image to the first target segmentation model obtained through training may be reduced, and a first target segmentation model obtained through training has a better region segmentation function. Therefore, the first target segmentation model can be invoked to implement a process of automatically obtaining a measurement indicator corresponding to an image, which can improve the stability and efficiency of image processing, and improve the accuracy of a measurement indicator corresponding to an obtained image.

the apparatus provided in the foregoing embodiments implements functions of the apparatus, the division of the foregoing functional units is merely an example for description. In the practical application, the functions may be assigned to and completed by different functional units according to the requirements, that is, the internal structure of the apparatus is divided into different functional units, to implement all or some of the functions described above. In addition, the apparatus and method embodiments provided in the foregoing embodiments belong to the same concept. For the specific implementation process, reference may be made to the method embodiments.

In an exemplary embodiment, a computer device is further provided, including a processor and a memory, the memory storing at least one computer program. The at least one computer program is loaded and executed by one or more processors to cause the computer device to implement the image processing method according to any one of the foregoing embodiments or the model training method according to any one of the foregoing embodiments. The computer device may be a terminal, or may be a server. The structures of the terminal and the server are separately described below.

Figure 26:
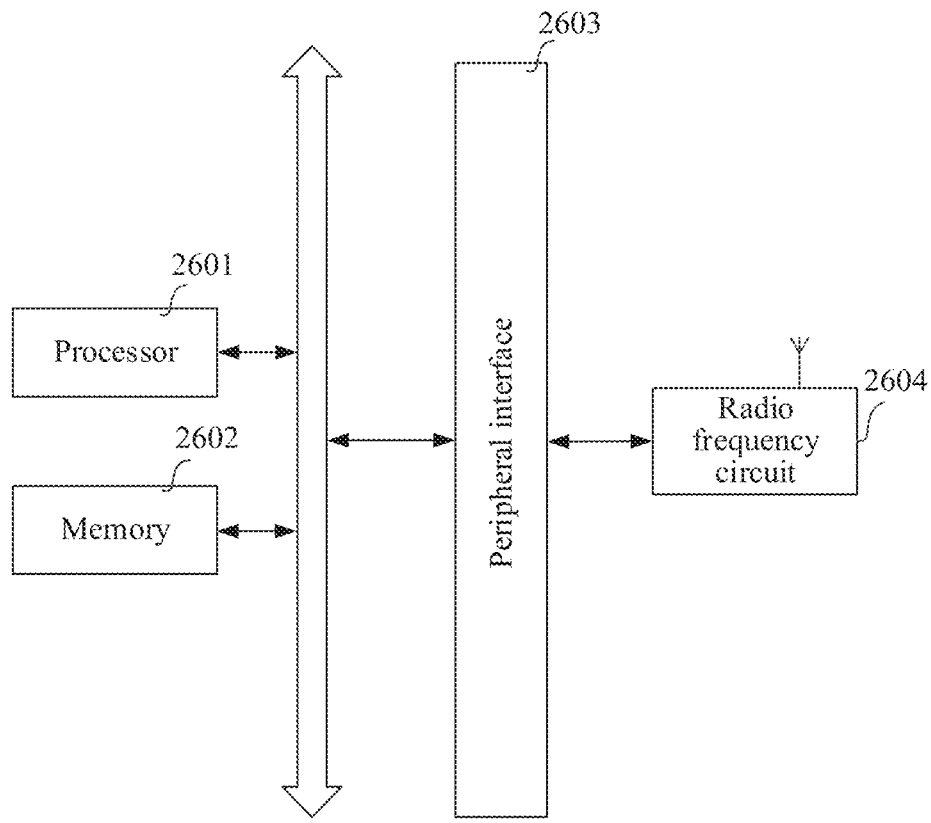
FIG. 26 is a schematic structural diagram of a terminal according to an embodiment of this disclosure.

FIG. 26 is a schematic structural diagram of a terminal according to an embodiment of this disclosure. The terminal may be a smartphone, a tablet computer, a notebook computer, or a desktop computer. The terminal may also be referred to as user equipment, a portable terminal, a laptop terminal, or a desktop terminal, among other names. Generally, the terminal includes a processor 2601 and a memory 2602.

The processor 2601 may include one or more processing cores, for example, a 4-core processor or an 8-core processor. The processor 2601 may be implemented in at least one hardware form of a digital signal processor (DSP), a field-programmable gate array (FPGA), and a programmable logic array (PLA). The processor 2601 may alternatively include a main processor and a coprocessor. The main processor is configured to process data in an awake state, also referred to as a central processing unit (CPU). The coprocessor is a low-power processor configured to process data in a standby state. In some embodiments, the processor 2601 may be integrated with a graphics processing unit (GPU). The GPU is configured to render and draw content that needs to be displayed on a display. In some embodiments, the processor 2601 may further include an artificial intelligence (AI) processor. The AI processor is configured to process computing operations related to machine learning.

The memory 2602 may include one or more computer-readable storage media. The computer-readable storage media may be non-transient (that is, non-transitory). The memory 2602 may further include a high-speed random access memory and a non-volatile memory, for example, one or more disk storage devices or flash storage devices. In some embodiments, the non-transitory computer-readable storage medium in the memory 2602 is configured to store at least one instruction, the at least one instruction being configured to be executed by the processor 2601 to cause the terminal to implement the image processing method or the model training method provided in the method embodiments of this disclosure.

In some embodiments, the terminal may include a peripheral interface 2603 and at least one peripheral. The processor 2601, the memory 2602, and the peripheral device interface 2603 may be connected through a bus or a signal cable. Each peripheral device may be connected to the peripheral device interface 2603 through a bus, a signal cable, or a circuit board. Specifically, the peripheral includes a radio frequency circuit 2604.

The peripheral interface 2603 may be configured to connect at least one peripheral device related to I/O to the processor 2601 and the memory 2602. The radio frequency circuit 2604 is configured to receive and transmit a radio frequency (RF) signal, which is also referred to as an electromagnetic signal. The radio frequency circuit 2604 communicates with a communications network and other communications devices by using the electromagnetic signal. In this way, the terminal may acquire an image as described in step 203 above. For example, the terminal extracts the image from an image library based on the radio frequency circuit 2604, or receives the image sent by the image acquisition device with a communication connection, or obtains the image manually uploaded, or the like.

A person skilled in the art may understand that a structure shown in FIG. 26 constitutes no limitation on the terminal. The terminal may include more or fewer assemblies than those shown in the drawings, some assemblies may be combined, and a different assembly may be used to construct the device.

Figure 27:
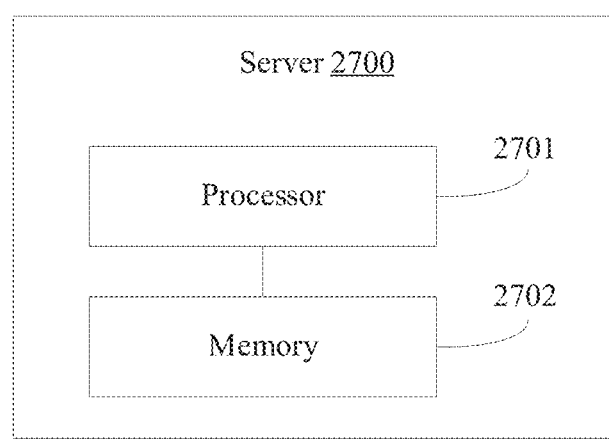
FIG. 27 is a schematic structural diagram of a server according to an embodiment of this disclosure.

FIG. 27 is a schematic structural diagram of a server 2700 according to an embodiment of this disclosure. The server 2700 may vary greatly because a configuration or performance varies, and may include one or more central processing units (CPU) 2701 and one or more memories 2702. The one or more memories 2702 store at least one computer program, and the at least one computer program is loaded and executed by the one or more processors 2701 to cause the server to implement the image processing method or the model training method provided in the foregoing various method embodiments. Certainly, the server may further include other components for implementing device functions.

In an exemplary embodiment, a computer-readable storage medium is further provided, the computer-readable storage medium storing at least one computer program, the at least one computer program being loaded and executed by a processor of a computer device to cause a computer to implement the image processing method according to any one of the foregoing embodiments or the model training method according to any one of the foregoing embodiments.

In an implementation, the computer-readable storage medium may be a read-only memory (ROM), a random access memory (random-access memory, RAM), a compact disc read-only memory (CD-ROM), a magnetic tape, a floppy disk, an optical data storage device, and the like.

In an exemplary embodiment, a computer program product or a computer program is provided. The computer program product or the computer program includes computer instructions, and the computer instructions are stored in a computer-readable storage medium. A processor of a computer device reads the computer instructions from the computer-readable storage medium and executes the computer instructions to cause the computer device to perform the image processing method according to any one of the foregoing embodiments or the model training method according to any one of the foregoing embodiments.

In the specification and the claims of this disclosure, the terms "first", "second", and so on are intended to distinguish similar objects but do not necessarily indicate a specific order or sequence. It is to be understood that the data termed in such a way is interchangeable in proper circumstances, so that the embodiments of this disclosure described herein can be implemented in other sequences than the sequence illustrated or described herein. The implementations described in the foregoing exemplary embodiments do not represent all implementations that are consistent with this disclosure. On the contrary, the implementations are merely examples of devices and methods that are described in detail in the appended claims and that are consistent with some aspects of this disclosure.

Here, the term unit may refer to a software module, a hardware module, or a combination thereof. A software module (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit. A unit is configured to perform functions and achieve goals such as those described in this disclosure, and may work together with other related units, modules, programs, and components to achieve those functions and goals.

The foregoing descriptions are merely exemplary embodiments of this disclosure, but are not intended to limit this disclosure. Any modification, equivalent replacement, or improvement made within the principle of this disclosure shall fall within the protection scope of this disclosure.

What is claimed is:

1. An imaging processing model training method, performed by a computer device, comprising:
    obtaining a first sample image and a first standard region proportion corresponding to a first object in the first sample image, the first standard region proportion being for indicating a proportion of a region where the first object is located in the first sample image;
    obtaining a standard region segmentation result corresponding to the first sample image based on the first standard region proportion, the standard region segmentation result being for more accurately indicating the region of the first object in the first sample image than the first standard region proportion; and
    performing attribute transformation on the first sample image to obtain an attribute-transformed first sample image having a target visual attribute; and
    training a first initial segmentation model based on the attribute-transformed first sample image and the standard region segmentation result, to obtain a first target segmentation model.

2. The method according to claim 1, wherein the obtaining the standard region segmentation result corresponding to the first sample image based on the first standard region proportion comprises:
    invoking at least one second target segmentation model to perform region segmentation on the first sample image, to obtain at least one candidate region segmentation result, the at least one second target segmentation model being trained based on a second sample image and a standard region division image corresponding to the second sample image, and the standard region division image corresponding to the second sample image being obtained based on a second standard region proportion corresponding to the first object in the second sample image; and
    using a candidate region segmentation result in the at least one candidate region segmentation result that meets a first matching condition associated with the first standard region proportion as the standard region segmentation result corresponding to the first sample image.

3. The method according to claim 2, wherein the at least one second target segmentation model comprises at least one second target segmentation model respectively corresponding to a reference number of second initial segmentation models, and the method further comprises:
    obtaining the standard region division image corresponding to the second sample image based on the second standard region proportion; and
    separately training the reference number of second initial segmentation models based on the second sample image and the standard region division image for different numbers of rounds, to obtain at least one second target segmentation model corresponding to the reference number of second initial segmentation models.

4. The method according to claim 3, wherein the obtaining the standard region division image corresponding to the second sample image based on the second standard region proportion comprises:
    obtaining a threshold interval corresponding to a reference color channel and a sample channel image corresponding to the second sample image under the reference color channel;
    performing binarization processing on the sample channel image based on the threshold interval, to obtain a binary image;
    performing morphology processing on the binary image, to obtain at least one candidate region division image; and
    using a candidate region division image in the at least one candidate region division image that meets a second matching condition associated with the second standard region proportion as the standard region division image corresponding to the second sample image.

5. The method according to claim 4, wherein the obtaining the threshold interval corresponding to the reference color channel comprises:
obtaining a first channel image corresponding to a first reference image under the reference color channel and a second channel image corresponding to a second reference image under the reference color channel, the first reference image excluding the first object, and the second reference image comprising the first object;
obtaining a first pixel value distribution of the first channel image;
obtaining a second pixel value distribution of the second channel image; and
determining the threshold interval corresponding to the reference color channel based on the first pixel value distribution and the second pixel value distribution.

6. The method according to claim 4, wherein the performing the morphology processing on the binary image to obtain at least one candidate region division image comprises:
determining, based on the binary image, a predicted region proportion corresponding to the first object in the second sample image; and
in response to the predicted region proportion being less than the second standard region proportion, expanding the binary image with a reference expansion kernel to obtain the at least one candidate region division image.

7. The method according to claim 4, wherein the performing the morphology processing on the binary image to obtain at least one candidate region division image comprises:
determining, based on the binary image, a predicted region proportion corresponding to the first object in the second sample image; and
in response to the predicted region proportion being greater than the second standard region proportion, reducing the binary image with a reference reduction kernel to obtain the at least one candidate region division image.

8. An image processing method, performed by a computer device, comprising:
obtaining an image comprising a first object, wherein the image corresponds to at least one color channel;
performing attribute transformation on the image to obtain an attribute-transformed image having a target visual attribute by:
determining pixel mean values respectively corresponding to color channels based on pixel values of pixels in the image under the color channels,
performing numeric transformation on the pixel mean values corresponding to the color channels using reference values corresponding to the color channels, to obtain pixel value transformation references respectively corresponding to the color channels, the reference values corresponding to the color channels being determined based on the target visual attribute, and
transforming the pixel values of the pixels in the image under the color channels based on the pixel value transformation references respectively corresponding to the color channels;
invoking a first target segmentation model to perform region segmentation on the attribute-transformed image, to obtain a first region segmentation result corresponding to the image, the first region segmentation result being for indicating a region of the first object in the image; and
obtaining a measurement indicator corresponding to the image based on the first region segmentation result, the measurement indicator being for indicating a proportion of a region in the image, a first object located in the region in the image meeting a region limiting condition.

9. The method according to claim 8, wherein the performing the attribute transformation on the image comprises:
obtaining an image transformation model, the image transformation model being configured to output an image having the target visual attribute; and
invoking the image transformation model to perform attribute transformation on the image.

10. The method according to claim 8, wherein the obtaining the measurement indicator corresponding to the image based on the first region segmentation result comprises:
determining a target region in the image;
filtering the region of the first object in the image using the target region, to obtain the region of the first object that meet the region limiting condition in the image; and
comparing the region of the first object that meet the region limiting condition with a total region of the image, to obtain the measurement indicator corresponding to the image.

11. The method according to claim 8, wherein the first target segmentation model is a link net model.

12. An image processing model training method, performed by a computer device, comprising:
obtaining a first sample image and a standard region segmentation result corresponding to the first sample image by:
invoking at least one second target segmentation model to perform region segmentation on the first sample image, to obtain at least one candidate region segmentation result, the at least one second target segmentation model being trained based on a second sample image and a standard region division image corresponding to the second sample image, and the standard region division image corresponding to the second sample image being obtained based on a second standard region proportion corresponding to a first object in the second sample image, and
using a candidate region segmentation result in the at least one candidate region segmentation result that meets a first matching condition associated with a first standard region proportion as the standard region segmentation result corresponding to the first sample image, the standard region segmentation result being for indicating a region of the first object in the first sample image;
performing attribute transformation on the first sample image to obtain an attribute-transformed first sample image having a target visual attribute; and
training a first initial segmentation model based on the attribute-transformed first sample image and the standard region segmentation result, to obtain a first target segmentation model.

13. The method according to claim 12, wherein the at least one second target segmentation model comprises at least one second target segmentation model respectively corresponding to a reference number of second initial segmentation models, and the method further comprises:

obtaining the standard region division image corresponding to the second sample image based on the second standard region proportion; and separately training the reference number of second initial segmentation models based on the second sample image and the standard region division image for different number of rounds, to obtain at least one second target segmentation model corresponding to the reference number of second initial segmentation models.

14. The method according to claim 13, wherein the obtaining the standard region division image corresponding to the second sample image based on the second standard region proportion comprises:

obtaining a threshold interval corresponding to a reference color channel and a sample channel image corresponding to the second sample image under the reference color channel;

using the threshold interval to perform binarization processing on the sample channel image to obtain a binary image;

performing morphology processing on the binary image, to obtain at least one candidate region division image; and using a candidate region division image in the at least one candidate region division image that meets a second matching condition with the second standard region proportion as the standard region division image corresponding to the second sample image.

15. The method according to claim 14, wherein the obtaining the threshold interval corresponding to the reference color channel comprises:

obtaining a first channel image corresponding to a first reference image under the reference color channel and a second channel image corresponding to a second reference image under the reference color channel, the first reference image excluding the first object, and the second reference image comprising the first object;

obtaining a first pixel value distribution of the first channel image;

obtaining a second pixel value distribution of the second channel image; and determining the threshold interval corresponding to the reference color channel based on the first pixel value distribution and the second pixel value distribution.

16. The method according to claim 14, wherein the performing the morphology processing on the binary image to obtain the at least one candidate region division image comprises:

determining, based on the binary image, a predicted region proportion corresponding to the first object in the second sample image; and in response to the predicted region proportion being less than the second standard region proportion, expanding the binary image with a reference expansion kernel to obtain the at least one candidate region division image.

17. The method according to claim 14, wherein the performing the morphology processing on the binary image to obtain the at least one candidate region division image comprises:

determining, based on the binary image, a predicted region proportion corresponding to the first object in the second sample image; and in response to the predicted region proportion is greater than the second standard region proportion, reducing the binary image with a reference reduction kernel to obtain the at least one candidate region division image.

* * * * *